United States Patent [19]

Hanaya

[11] Patent Number: 5,630,692

[45] Date of Patent: May 20, 1997

[54] METHOD AND APPARATUS FOR PICKING UP PACKAGED SHEET

[75] Inventor: Morimasa Hanaya, Mishima, Japan

[73] Assignee: Tokushu Paper Mfg. Co., Ltd., Shizuoka-ken, Japan

[21] Appl. No.: 441,427

[22] Filed: May 15, 1995

[30] Foreign Application Priority Data

| May 16, 1994 | [JP] | Japan | 6-125801 |
| Jun. 28, 1994 | [JP] | Japan | 6-170300 |
| Nov. 2, 1994 | [JP] | Japan | 6-293910 |

[51] Int. Cl.$^6$ .................................................. B65G 1/04
[52] U.S. Cl. ........................ 414/277; 414/281; 414/286; 414/627
[58] Field of Search .................................. 414/268, 269, 414/270, 277, 278, 280, 281, 286, 659, 660, 661, 799, 627, 737, 786

[56] References Cited

U.S. PATENT DOCUMENTS

| 4,419,035 | 12/1983 | Stobb | 414/799 X |
| 4,735,539 | 4/1988 | Häkkinen | 414/277 X |
| 4,789,295 | 12/1988 | Boucher, Jr. et al. | 414/280 X |
| 4,850,783 | 7/1989 | Maekawa | 414/268 X |
| 4,969,791 | 11/1990 | Stolzer | 414/627 X |
| 5,106,259 | 4/1992 | Anderson et al. | 414/786 |
| 5,170,863 | 12/1992 | Devroy | 414/281 X |
| 5,203,671 | 4/1993 | Cawley et al. | 414/799 X |
| 5,238,350 | 8/1993 | Krieg et al. | 414/278 |
| 5,328,316 | 7/1994 | Hoffmann | 414/277 X |
| 5,380,139 | 1/1995 | Pohjonen et al. | 414/661 X |
| 5,421,685 | 6/1995 | Elmer et al. | 414/661 X |

FOREIGN PATENT DOCUMENTS

| 0111848 | 6/1984 | European Pat. Off. . | |
| 0527331 | 2/1993 | European Pat. Off. . | |
| 0248789 | 8/1987 | Germany | 414/286 |
| 0275309 | 11/1989 | Japan | 414/286 |

*Primary Examiner*—James W. Keenan
*Attorney, Agent, or Firm*—Oblon, Spivak, McClelland, Maier & Neustadt, P.C.

[57] ABSTRACT

There is disclosed a method for picking up a ream of packaged sheets of a desired kind from a plurality of reams of one or more kinds stacked up on a respective one of cells in an automated warehouse and loading the picked-up ream of packaged sheets on a pallet. In the invention, a pick-up device, having a picking, gripping and pulling mechanism and a discharging and stacking mechanism, is located at a position adjacent to a respective cell by traveling the pick-up device horizontally and/or vertically. The pallet is located at a prescribed position. The pick-up device is operated to pick-up the ream of packaged sheet of the desired kind from the plurality of reams of one or more kinds stacked up on a respective cell. Specifically, the picking, griping and pulling mechanism is operated to pick upwards and grip the ream of packaged sheets to pull the same, and the pulling and piling mechanism is operated to withdraw the pulled ream of packaged sheets and stack the same on the pallet.

5 Claims, 16 Drawing Sheets

METHOD AND APPARATUS FOR PICKING UP PACKAGED SHEET

BACKGROUND OF THE INVENTION

1. Field of the Invention

The present invention relates in general to a method and apparatus for picking up packaged cargo of a flexible sheet material such as paper, film, or nonwoven fabric, and relates in particular to a method and apparatus for picking up a packaged sheet of a desired kind from a number of such packaged sheet of one or more kinds stacked up on a respective one of cells of an automated warehouse, and assorting and stacking the picked packaged sheet on pallets according to destinations, and/or for handling stacked pallets, on which no packaged sheet is stacked, for desired purposes. The description will be hereinafter directed to the handling of paper products although the products to be handled are not limited to them.

2. Related Art

In the pulp and paper industries, a unit of handling of cutting paper is based on "ream". Specifically, one ream is defined by 500 sheets of cutting papers (or 100 sheets of paper boards). In warehouses, the inventories are stored on pallets, each pallet having several tens of reams of the same kind of paper and weighing from about 800 to 1,200 Kg, and measuring about 1.5 to 1.8 m in height.

Clients such as distributors try to keep their inventories as low as possible and thus an order to a paper manufacturer will usually consist of small lots of a variety of paper products. Therefore, the paper manufacturer must ship many different kinds of paper products on a pallet, and in extreme cases, it is necessary to pick up reams of different kinds of packaged products manually one by one.

The warehouses for storing the above-mentioned paper products can be divided into two broad categories: a flat-stacking warehouse and an automated warehouse.

In the flat-stacking warehouse, the paper goods are stored in piles from its innermost part, and to access a ream of one type, it is always necessary that other types of reams piled in front must first be removed by a forklift to make a space before the desired ream can be accessed. Such process is not only time-consuming but is prone to damaging paper goods because of accidental bumping against the stored paper goods during the process of finding and loading the goods.

In an automated warehouse, a storage pallet containing a full load of reams of the desired type of paper goods must first be retrieved out from the rack, and the desired number of reams must be picked out from the storage pallet manually. The remaining goods on the storage pallet must then be reinputted to the original rack. In this type of operation, the stacker cranes are fully busy continually, and in some cases, cause the required shipping schedule to be missed, because some ordered items cannot be accessed in time for shipping. A remedy might be to reduce the number of the shelves or cells facing the stacker crane to less than a third of the existing number, thus considerably raising the effective number of stacker cranes per shelving. The enlarged area for the manual picking operation must also be ensured to handle the increased number of pallets, and the number of men required to handle the goods is increased. Thus, the overall balance, between the benefits gained by automated warehouses and the increased handling costs including the capital investments necessary, largely negates the benefits of automation in such instances.

Commodity papers such as woodfree papers are limited in their selection, and it is rare to receive small lot orders for these types of papers. However, for speciality papers or fancy papers, orders are often received for one ream for each of different colors, basis weights, or patterns. Furthermore, the paper goods such as speciality papers consume far more net storage space than the general purpose papers in an ordinary multi-storied flat-stacking warehouse, because larger access space must be reserved for the forklift for handling the speciality papers.

Furthermore, even in the automated warehouses, economical operation of warehouses becomes difficult when the proportion of speciality papers or the like is high. For relatively small scale operations, twin type stacker cranes are being used, but they are not suitable for large scale operations.

SUMMARY OF THE INVENTION

It is therefore the primary object of the present invention to provide a method and apparatus for picking up ream of packaged sheet, which enables one to pick-up a ream of packaged sheet of a designated kind from a number of (for example, several tens of) reams of the same kind stacked on a storage pallet on the cell of an automated warehouse, and to deliver the picked-up packaged sheet to a pallet designated to a respective shipping destination until a required number of packaged sheets have been loaded, and repeating the process for another kind of packaged sheet until a required assortment of goods has been loaded on the pallet.

According to a first aspect of the present invention, there is provided a method for picking up a ream of packaged sheets of a desired kind from a plurality of reams of one or more kinds stacked up on a respective one of cells in an automated warehouse and loading the picked-up ream on a pallet, the cells constituting a plurality of vertically spaced groups of horizontally extending racks, the method comprising the steps of:

(a) locating a pick-up device having a picking, gripping and pulling mechanism and a discharging and stacking mechanism, at a position adjacent to a respective one of the cells by moving the pick-up device horizontally and/or vertically;

(b) locating the pallet at a prescribed position; and (c) operating the pick-up device to pick-up the ream of packaged sheet of the desired kind from the plurality of reams of one or more kinds stacked up on a respective one of cells, the operating step including operating the picking, gripping and pulling mechanism to pick upwards and grip the stacked ream to pull the same, and operating the discharging and stacking mechanism to withdraw the pulled ream and discharging and stacking the same on the pallet.

In the foregoing, the pick-up device locating step (a) may include positioning the pick-up device with rough precision and subsequently positioning the with greater precision. The pick-up device operating step (c) may include positioning the picking, gripping and pulling mechanism and the discharging and stacking mechanism to prescribed positions adjacent to the ream, so as to be independent of each other. The pick-up device operating step (c) may include positioning the picking, gripping and pulling mechanism and the discharging and stacking mechanism to prescribed positions adjacent to the ream simultaneously in association with each other.

According to a second aspect of the present invention, there is provided an apparatus for picking up a ream of packaged sheets of a desired kind from a plurality of reams of one or more kinds stacked up on a respective one of a plurality of cells in an automated warehouse and loading the picked-up ream on a pallet, the cells constituting a plurality of vertically spaced groups of horizontally extending racks, the apparatus comprising:

(a) a traveling mechanism constructed to travel horizontally along a respective rack;

(b) a lifting mechanism attached to the traveling mechanism and constructed to move vertically along the cells disposed vertically in series, the lifting mechanism being provided with an inching function;

(c) a lifting and pulling mechanism attached to the traveling mechanism and constructed to locate the pallet at a prescribed position; and (d) a pick-up device attached to the lifting mechanism for picking up the ream of the desired kind from the plurality of reams of one or more kinds stacked up on a respective cell, the pick-up device including a picking, gripping and pulling mechanism for picking upwards and gripping the stacked ream to pull the same, and a discharging and stacking mechanism for withdrawing the pulled ream and discharging and stacking the same on the pallet.

In the foregoing, the lifting mechanism may include a lift frame disposed on the traveling mechanism, and the lifting and pulling mechanism may be disposed on the lift frame. The lifting mechanism may include a lifting device B1 for operating said picking, gripping and pulling mechanism, a lifting device B2 for operating said discharging and stacking mechanism, a lifting device B4 for operating said lift frame to move the lifting and pulling mechanism vertically. In addition, the picking, gripping and pulling mechanism and the discharging and stacking mechanism may be connected together to define a unitary construction, the lifting mechanism including at least one of lifting devices B1 or B2 for operating the picking, gripping and pulling mechanism and the discharging and stacking mechanism, a lifting device B3 for operating the lifting and pulling mechanism, and a lifting device B4 for operating the lift frame.

Furthermore, the lifting mechanism may include a lifting device B1 for operating the picking, gripping and pulling mechanism, a lifting device B2 for operating the discharging and stacking mechanism, a lifting device B3 for operating the lifting and pulling mechanism, and a lifting device B4 for operating the lift frame.

In addition, it is preferable that lifting devices B1 and B2 be constructed to be operable with higher precision than the lifting device B4. The lifting device B1 or B2 may include a high-precision transmission member and a drive device connected to the transmission member, whereas the lifting device B4 includes a high-power transmission member and a drive device connected to the high-power transmission member.

Moreover, the lifting device B3 may comprise a lifter disposed on the life frame and a lifter drive device connected to the lifter for operating the same, the lifting and pulling mechanism being disposed on the lifter. Alternately, the lifting device B3 may comprise a cable member connected to the lifting and pulling mechanism and a drive device connected to the cable member for driving the same.

The picking, gripping and pulling mechanism may include a picking frame attached to the lift frame so as to be movable vertically therealong, and a plurality of picking shuttle frames disposed on the picking frame so as to be slidable towards and away from a respective cell, and a picking frame drive device connected to the picking shuttle frames for operating the picking shuttle frames. The picking, gripping and pulling mechanism may further include a turning mechanism disposed on the picking shuttle frames for permitting the picking, gripping and pulling operation to be performed with respect to the cells situated in opposed relation to each other, and at least two suction pads for picking the ream of packaged sheets and at least one ream grip for gripping the ream of packaged sheets, the suction pads and the ream grip being arranged on one of the shuttle frames.

The discharging and stacking mechanism may include an openable table frame attached to the lift frame so as to be movable vertically, and an openable table disposed on the table frame and having a pair of plates movable towards and away from each other, whereby an opening is formed between the supporting members to ensure stacking of the ream of packaged sheets therethrough.

Furthermore, in the preferred embodiment, the pick-up device itself is disposed on a stacker crane as an integral unit of the stacker crane. The apparatus is controlled through a central computer to proceed automatically to the address and the height of a target cell or shelf, and loads one ream at a time to make up a pallet containing the required number and kind of sheet products ordered.

The method and apparatus for picking up the packaged sheet according to the present invention enables one to load a pallet efficiently with no input of manual labor. Compared with the conventional methods, therefore, the orders can be delivered to customers more quickly with large savings in manpower and fewer damaged goods.

The method and apparatus for picking up the reams according to the present invention demonstrate a further feature that less space is needed to sort out the shipment.

Furthermore, as the packaged sheet is stacked up from the storage pallet on the shelves, many pallets containing only a few reams will be left in the warehouse. With the use of a computer control, it becomes possible to develop a program to build up the inventory automatically using the pick-up apparatus of the present invention so that the remaining stocks can be rationalized in a suitable number of fully loaded storage pallets.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF PREFERRED EMBODIMENTS OF THE INVENTION

The pick-up apparatus of the present invention will be explained with reference to the accompanying drawings.

Figure 1:
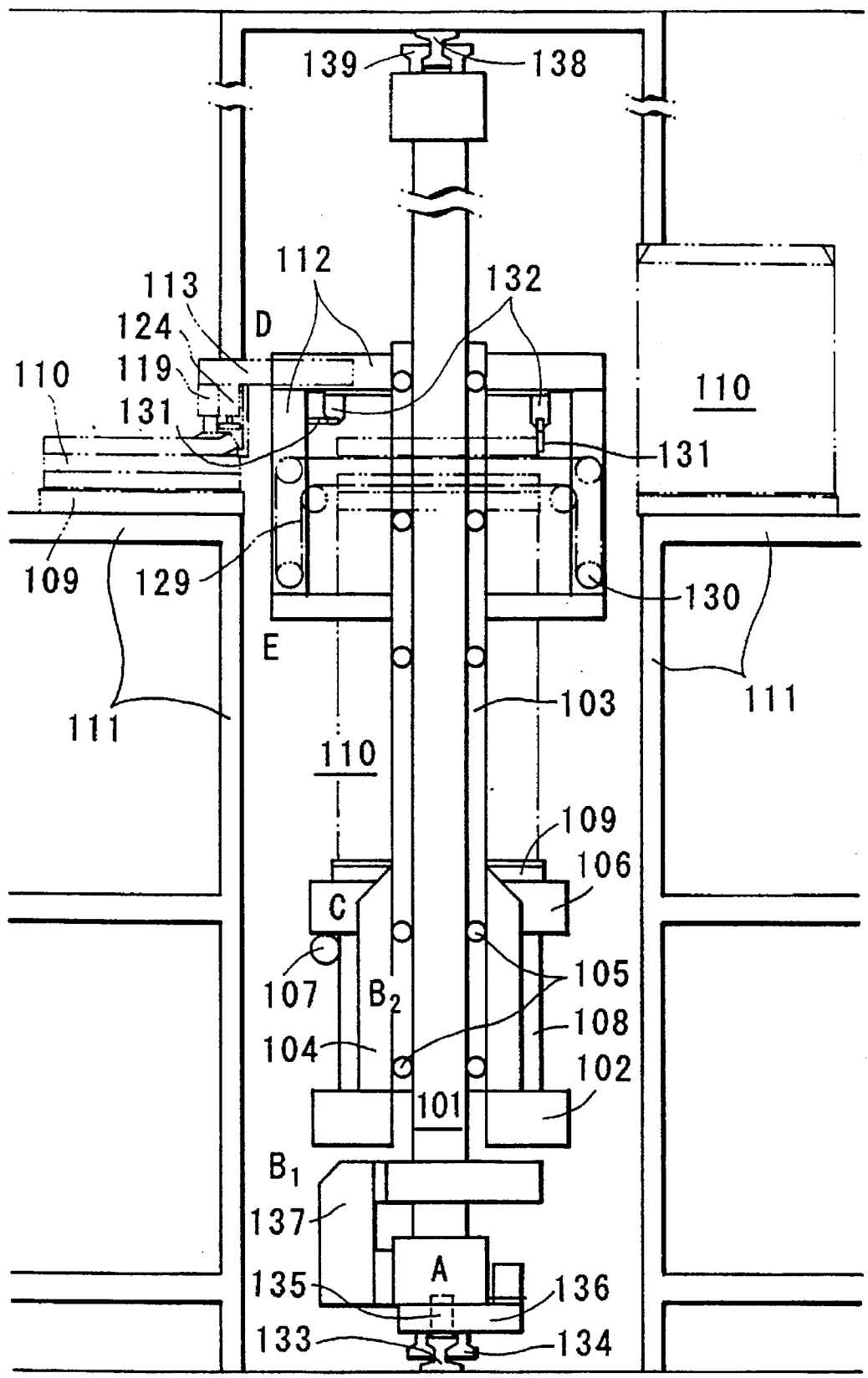
FIG. 1 is an overall side elevational view of a pick-up apparatus in accordance with a first embodiment of the present invention.

FIG. 1 depicts an overall side elevational view of the pick-up apparatus, in accordance with a first embodiment of the present invention. The pick-up apparatus is installed in an automated warehouse which comprises a number of vertically spaced racks each defining a plurality of shelves or cells 111 arranged in a horizontal direction.

The pick-up apparatus comprises a horizontal traveling mechanism or device A; a vertical lifting and inching mechanism or device B; a shuttle fork mechanism or pallet-handling device C; a picking, gripping and pulling mechanism or device D; and a pulling, discharging and stacking mechanism or device E.

The detailed construction of each mechanism A, B, C, D, E as well as its operation will be described in the following.

The horizontal traveling mechanism A is defined by a stacker crane installed in an automated warehouse. Specifically, the horizontal traveling mechanism A comprises a support frame structure of a generally rectangular shape including a pair of vertical front and back main frames 101 respectively disposed on front and back ends of the crane and a pair of upper and lower horizontal frames connecting the main frame 101. An upper travel rail 138 and a lower travel rail 133 are respectively mounted on the ceiling and floor of the automated warehouse so as to extend on a line between opposing shelf plates of rack 111. Front and back pairs of upper guide rollers 139 are mounted on the upper horizontal frame of the main frame 101 so as to be held in rolling contact with the upper travel rail 138, and front and back pairs of lower guide rollers 134 are mounted on the lower horizontal frame of the main frame 101 so as to be held in rolling contact with the lower travel rail 133. A pair of front and back running wheels 135 are further provided on the lower horizontal frame, and a horizontal travel drive device 136, which includes a suitable drive motor mounted on the lower horizontal frame, is operably connected to the front running wheel 135, whereby the support frame structure or the stacker crane can be caused to travel along the racks while keeping a prescribed constant distance to a respective rack, and can be stopped at a desired position in front of a desired cell or shelf 111, by controlling the operation of the drive device 136 using a positioning sensor system having, for example, infrared ray emitter/photocell receiver.

The vertical lifting mechanism B comprises a lift frame assembly 102 of a rectangular plate shape and a pair of right and left vertical lift frames 103 attached to the lift frame assembly 102. A plurality of guide rollers 105 are mounted on each of the vertical lift frames 103 so as to be held in rolling contact with a respective main frame 101. In addition, a pair of endless lift chains 147, each in the form of a loop, are accommodated in the main frames 101, and are attached at both ends to the top and bottom ends of the lift frame assembly 102 through suitable hanger members, so as to run on chain wheels 148 provided for tension control purposes. In addition, a vertical drive device of lift frame 137, including a suitable drive motor and auxiliary transmission mechanism, is provided on the vertical frame structure, and the lift chains 147 are operably connected to a drive wheel attached to the vertical drive device of lift frame 137. Thus, the vertical lift frames 103 as well as the lift frame assembly 102 can be moved up and down by the vertical drive device of lift frame 137 along the main frames 101. As is the case with the horizontal traveling mechanism A, the lift frame assembly 102 can be stopped at a desired height by controlling the operation of the vertical drive device of lift frame 137 using a positional sensor system having, for example, an infrared ray emitter/photocell receiver.

Provided on the lift frame assembly 102 at four corners are front and back pairs of right and left vertical lift frames 104 for reinforcing the vertical lift frames 103, and a lifting device 108, which includes lifting arms of two or more movable steps and a drive device such as a hydraulic cylinder for driving the lifting arms, is further mounted on the lift frame assembly 102 at a position surrounded by the vertical lift frames 104.

In the foregoing, the vertical drive device of lift frame 137, the lifting device 108 and the lift frame assembly 102 are constructed such that when picking up the ream of packaged sheet 110 stacked on the pallet on the cell 111 of the automated warehouse after the loading of every one ream, the vertical drive device of lift frame 137 is driven to move the lift frame assembly 102 downwards by the height corresponding to that of one ream, whereas the lifting device 108 is also driven to move the picked-up ream placed thereon downwards by the height corresponding to that of two reams. The positioning of the lift frame assembly 102 and the lifting device 108 can be carried out accurately based on the top surface of the ream of packaged sheet 110 using a suitable positional sensor system having infrared ray emitter/photocell receiver.

Furthermore, when an operation on one shelf level is completed, the crane moves to the next shelf designated by the computer, by operating the horizontal travel drive device 136 and the vertical frame drive device 137, and a next pick-up operation is commenced at the shelf. Normally, a pallet having a common delivery address is prepared by stacking various kinds of ream of packaged sheet 110 up to a height of 1.5 m. When this height is reached, the loading of the pallet is completed, and the pallet is taken to the outgoing depot and is shipped out.

The lifting and pulling device (pallet-handling device) C comprises a fork device 106 mounted on the lifting device 108, and a forking drive device 107 operably connected to the fork device 106 for driving the same. The fork device 106 includes upper, middle and lower fork plates (not shown) supported through upper and lower sets of right and left support rollers so as to be retractable and extensible in a direction towards and away from the cell. Three chains are provided in the fork device 106, with one end of each chain being connected to a respective fork plate thereof, and a chain wheel is provided to guide each chain to define an appropriate loop, whereby a successive step-up movement mechanism is ensured. Thus, with the operation of the forking drive device 107, the lower fork plate, the middle fork plate and the upper fork plate are successively extended or retracted in operable association with each other. The positioning of the fork plates is carried out very accurately, by controlling the operation of the drive device 107 using a positioning sensor system having, for example, infrared ray emitter/photocell receiver, such that the upper fork plate is stopped at predetermined three positions, i.e., a foremost position, a middle position and a back position.

In operation, the lifting and pulling device C is used to pull in an empty pallet 109 from the shelf 111 prior to loading the pallet 109, or when a pick-up is not required, the pallet 109 having a full load of paper reams 110 in the crane, and the pallet is taken to an outgoing depot and is shipped out.

The picking, gripping and pulling mechanism D and the stacking mechanism E are attached to the vertical lift frames 103, whereby they can be moved vertically by the vertical lifting mechanism B.

The picking, gripping and pulling mechanism D comprises a picking frame assembly 112 arranged on the vertical lift frames 103 which can be moved vertically by the vertical lifting mechanism B. A pair of first picking shuttle frames 113, each having an I-shaped rail member at an outer end thereof, is suspended by the picking frame assembly 112, with the I-shaped rail members being supported on right and left sets of picking guide rollers 115 attached to the vertical lift frames 103, so as to be slidable in a direction perpendicular to the direction traveled by the stacker crane. A first picking frame drive device 114, which has drive ends connected to inner ends of the first picking shuttle frames 113, is mounted on the lower surface of the top frame portion of the picking frame assembly 112 for moving the first picking shuttle frames 113 along the picking frame assembly 112. Thus, in accordance with commands from the computer, while the stacker crane proceeds to the cell of the specified location and height, the first picking shuttle frames 113 are driven by the first picking frame drive device 114 and stopped at predetermined three positions, i.e., a foremost position, a middle position and a back position, as regulated by the positioning sensing system having infrared ray emitter/photocell receiver or proximity switches.

Furthermore, a pair of second picking shuttle frames 116 are positioned under the first picking shuttle frames 113 on the picking frame assembly 112 for sliding movement in a direction perpendicular to the direction traveled by the stacker crane, and second picking frame drive devices 117 are mounted on the lower surface of the first picking shuttle frames 113 for moving the second picking shuttle frames 116. Each second picking shuttle frame 116, which has a plurality of picking guide rollers 118 attached to outer end, is constructed so as to be slidable along a respective I-shaped rail member secured to the first picking shuttle frame 113 with the picking guide rollers 118 being guided by the I-shaped rail member, and its inner end is connected to the drive end of the second picking frame drive device 117.

Thus, with the operation of the drive device 117, the picking shuttle frames 116 can be moved along the I-shaped rail member, and stopped at predetermined right and left positions, i.e., a picking-start position, a picking-completion position and an intermediate position, as regulated by the positional sensing system having, for example, infrared ray emitter/photocell receiver or proximity switches.

Moreover, a pair of suction members are arranged on the forward ends of the lower surfaces of the second picking shuttle frames 116, and a suction pad drive device 121 is mounted on the lower surface of the second picking shuttle frames 116 for moving the suction members horizontally. Each suction member includes a suction pad 119, which is connected to a vacuum ejector (not shown), and a suction pad drive device 120 connected directly to the suction pad 119 for moving the suction pad 119 vertically. In addition, each suction member carrying a respective suction pad 119 is accommodated in a channel-shaped groove of a picking guide rail 122 mounted on the lower surface of the second picking shuttle frame 116 so as to be slidable therealong through picking guide rollers 123 attached thereto, and are connected at the both sides to the drive end of the suction pad drive device 121. Thus, with the operation of the suction pad drive device 121, the suction members carrying the suction pads 119 can be moved along the picking guide rail 122 and stopped at predetermined positions, i.e., a left-side picking-starting position, a left-side picking-completion position, an intermediate position, a right-side picking-completion position, and a right-side picking-starting position, as regulated by the positional sensing system having, for example, infrared ray emitter/photocell receiver or proximity switches.

Figure 4:
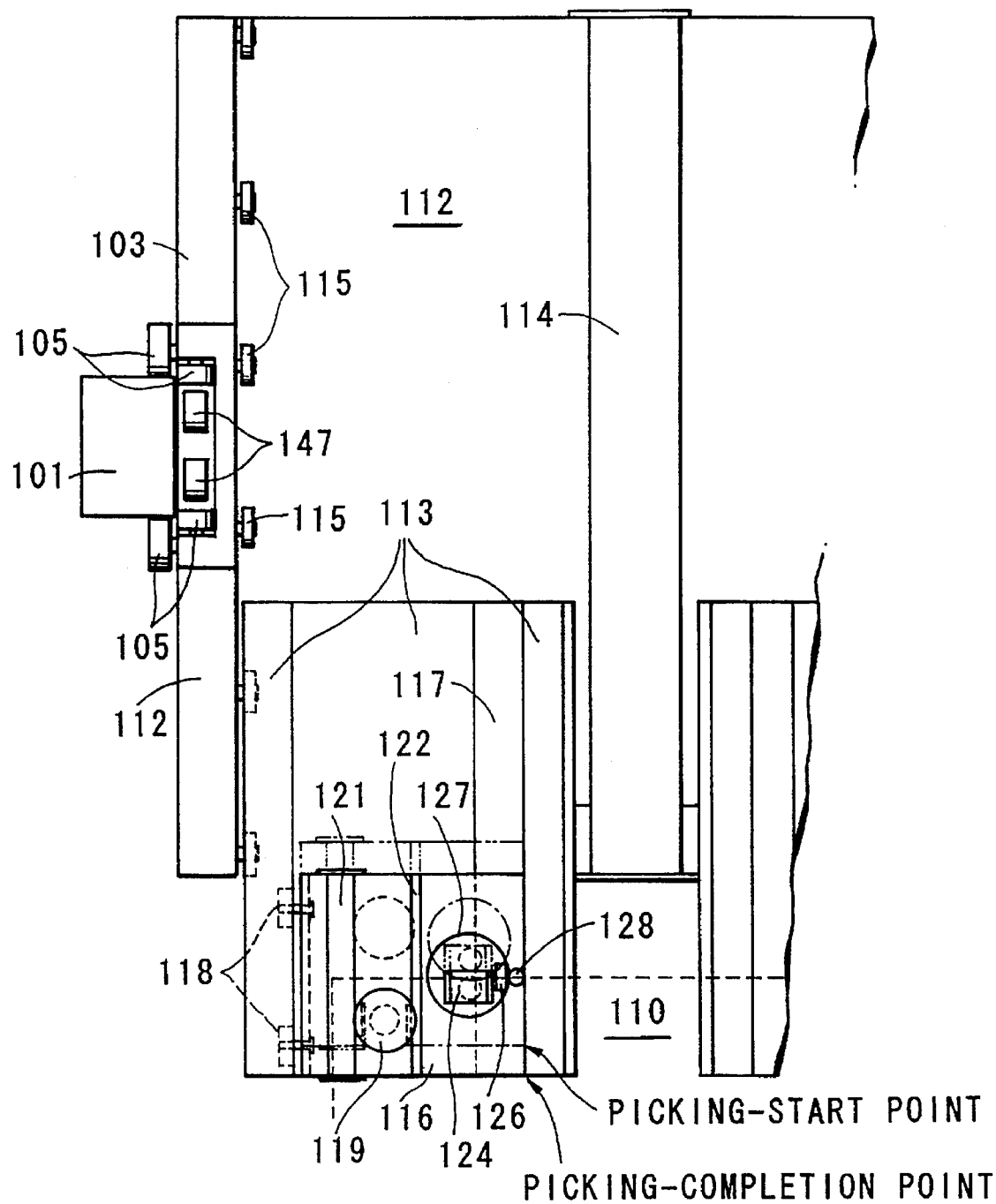
FIG. 4 is a view seen in the direction IV—IV in FIG. 2.

In operation, the suction member carrying the suction pad 119 is moved to the leading end of the second picking shuttle frame 116 in accordance with the commands from the computer, and when it reaches the picking-start point of the ream of packaged sheets 110 on the shelf 111 specified, it is constructed to stop temporarily at the corner picking-start point, as shown by the dotted lines in FIG. 4. In this case, a ream grip 124 (described later) is stopped in front thereof, and the suction pad drive device 120 directly connected to the suction pad 119 is operated to lower the suction pad 119 onto the top of the ream of packaged sheet 110. The suction pad 119 of the suction member is then evacuated by a vacuum device (not shown), and an electromagnetic valve is operated to reduce the pressure inside the suction pad 119, and the ream of packaged sheet is picked thereto. The suction pad drive device 120 is raised by operating the electromagnetic valve in reverse, and the ream grip 124 is stopped at such a position that the bottom end of the ream grip 124 can reach below the ream of packaged sheet completely.

Simultaneously with the ream grip 124 entering to grip the ream of packaged sheet 110, the suction pad driving device 121 is operated so that the suction member carrying the suction pad 119 proceeds the same distance in reverse to reach the picking-complete point. The stopping locations of the picking-start point such as the second picking shuttle frame 116, the suction pad drive device 121 and ream grip 124 disposed thereon are indicated by a single dotted line, and the picking-complete points are shown by a solid line in FIG. 4.

Below the front and back pair of second picking shuttle frames 116, there are also disposed a pair of front and back ream grips 124 for gripping the ream of packaged sheet. More specifically, a pair of ream grip turning tables 127, each of which can be driven by a respective drive device 128 to turn, are disposed on the second picking shuttle frames 116, and each ream grip 124 is arranged on the lower surface of a respective ream grip turning table 127. Thus, the ream grip 124 can be turned to the right or left by actuating the ream grip turning table 127, and stopped at such a prescribed right or left position to enable gripping of the ream of packaged sheet 110, as regulated by the positioning sensing system having, for example, infrared ray emitter/photocell receiver or proximity switches. In addition, a grip operating device including a ream grip shuttle drive device 125 and a ream grip shaking device 126 are provided between the ream grip turning table 127 and the ream grip 124 for operating the ream grip 124 in a desired manner. Specifically, the ream grip shuttle drive device 125 includes a fixed portion secured on the ream grip turning table 127 and a shuttle drive rod constructed to be movable in a vertical direction. The ream grip shaking device 126 includes a fixed ream grip member of a reverse F-shape secured to the fixed portion of the ream grip shuttle drive device 125, and a movable lip connected to the shuttle drive rod of the ream grip shuttle drive device 125 and adapted to be movable in a vertical direction. Thus, the ream grip 124 is constructed to be closable or openable and/or shaked by actuating the ream grip shuttle drive device 125 to move the movable lip relative to the fixed grip member and by actuating the grip shaking device 126, to thereby grip or release the leading outer tip of the ream of packaged sheet 110. Thus, the ream grip 124 can be moved in the pulling direction of the ream of packaged sheet 110 to actuate the ream grip shuttle drive device 125 into an "open" position to release the ream of packaged sheet 110, and at the same time, the grip shaking device 126 is operated to release the ream grip in an upper off-side direction to proceed the ream of packaged sheet 110 in a stacker conveyor 129 (to be explained later).

Although not shown, it is possible to omit the grip turning table. For example, the fixed portion of the ream grip shuttle drive device may be secured to a driving end of a turning drive device such as a rotary actuator, whereas the drive end of the ream grip shaking device may be directly connected to the a fixed-side casing of the turning drive device, and the fixing end of the ream grip shaking device may be arranged directly on the lower surface of the second picking shuttle frame 116.

When the ream grips 124, which had been pre-turned in the direction of travel according to commands from the central computer, has reached the target ream of packaged sheet 110 on the shelf 111, it stops first at the picking-start point which is the terminal end (the peripheral edge is shown by the dotted line) of the ream of packaged sheet 110, as shown in FIG. 4. The suction pad 119 picks and lifts the ream of packaged sheet 110, the first shuttle frame drive device 114 is operated to move the first shuttle frame 113 stepwise, thereby moving the ream grips 124 connected thereto, and the lower end of the fixed frame of the reverse F-shape is stopped below the ream of packaged sheet 110, by having the movable lip enter the upper part at the picking-complete point. The ream grip shuttle drive device 125 is operated to close the ream grips 124 to enable gripping the ends of the ream of packaged sheet 110.

It is preferable to set limit switches on the inside of the ream grips 124 to confirm that the ream of packaged sheet 110 has been firmly gripped therein, before closing the ream grips 124. When the ream of packaged sheet 110 is to be pulled in on the stacker conveyor 129 by operating the second shuttle frame drive device 117 and the first shuttle frame drive device 114, it is also preferred that compressed air be injected between the top and bottom ream of packaged sheet 110 to reduce the surface friction.

In the pulling, discharging and stacking mechanism E, which is disposed under the picking, gripping and pulling mechanism D, a pair of stacker conveyors 129, each including a first portion having a plurality of cross bars slightly greater in length than that of the stacked ream of packaged sheet 110 and a second portion of similar length having no cross bars, are provided. Chain wheels 130 are mounted on both inner sides of the picking frame assembly 112, and the stacker conveyor which comprises a pair of endless chains carrying the cross bars across the pairs of link plates is wound around the chain wheels. Furthermore, a suitable one of the chain wheels 130 is connected to a drive device (not shown). Thus, the stacker conveyor 129 can be caused to travel intermittently in both right and left directions in a reversible way, and can be stopped at a prescribed right or left starting position, by controlling the operation of the drive device using a positional sensor system having, for example, infrared ray emitter/photocell receiver.

Furthermore, a pair of ream stoppers 131, each comprised of an elongated plate member, are mounted on the upper surface of each stacker conveyor 129 having a thin gap at a generally central portion on the opposite terminal ends directed to the cells. Each ream stopper 131 is operably connected to a respective stopper rotating device 132 (or a suitable elevating device), which is provided on the fixed portion of the picking frame drive device 114 mounted on the picking frame assembly 112.

Figure 3:
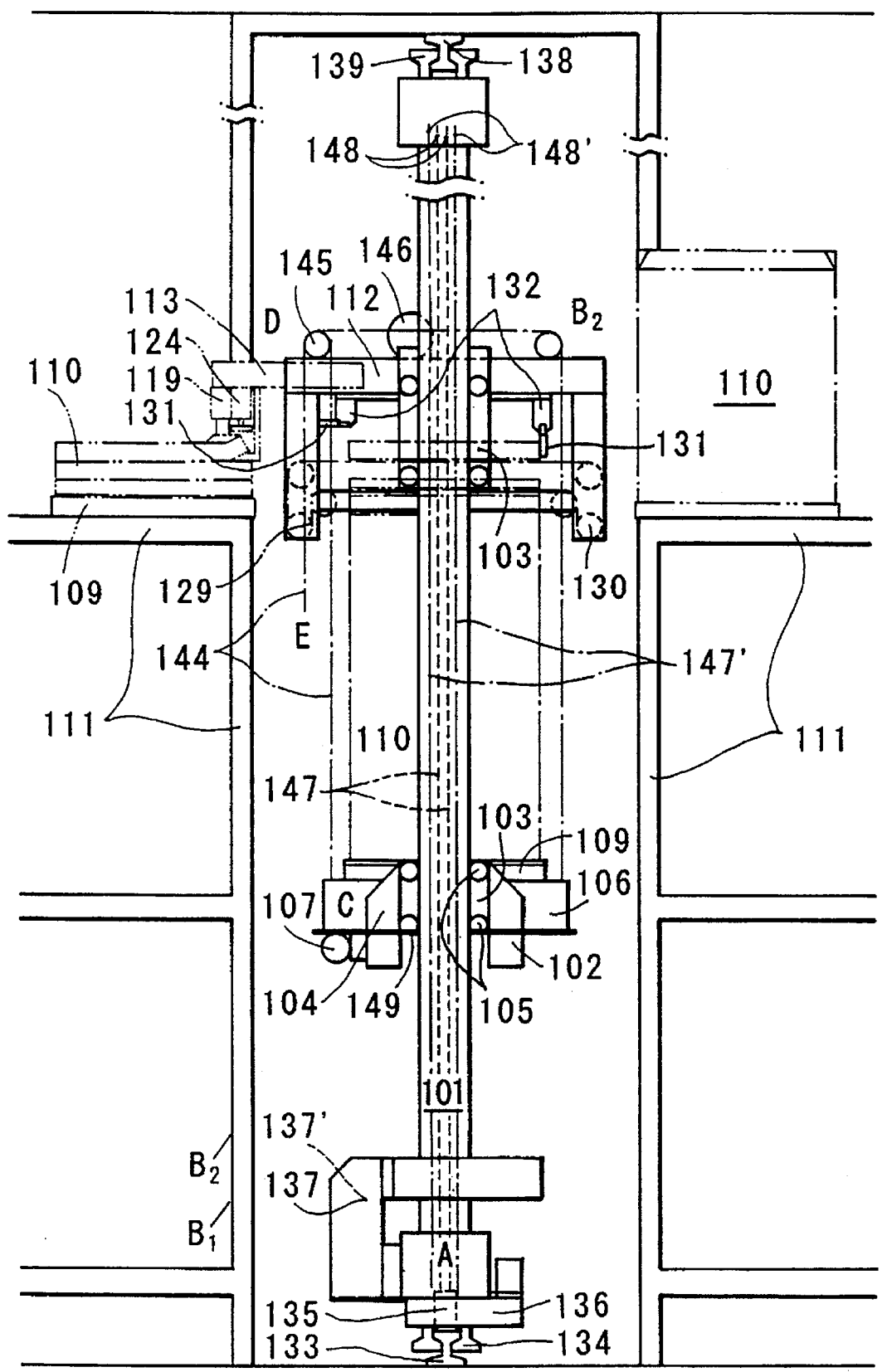
FIG. 3 is a view similar to FIG. 1, but showing a modification of the pick-up apparatus of FIG. 1.

Thus, referring to the embodiments shown in FIGS. 1 or 3, when a prescribed ream of packaged sheets 110 are to be picked up from a shelf plate of rack 111 (left-side cell in Figures) of the automated warehouse, the left ream stopper 131 is first lifted up by the operation of its associated stopper rotating device 132, to permit the ream of packaged sheet 110 to proceed under the left ream stopper 131 (in the right direction in the Figures) until they are stopped by the right ream stopper 131 which is kept in a vertical position. Then, when the ream of packaged sheet 110 is brought into contact with the right ream stopper 131, the ream of packaged sheet 110 is discharged through the second portion without cross bars onto the pallet 109.

Furthermore, a parallel pair of centering devices 142, each comprised of an elongated plate member, are mounted on the upper surface of each stacker conveyor 129 having a thin gap at the opposite sides thereof. Each centering device 142 is operably connected to a respective centering drive device 143 for moving the centering device towards and away from the corresponding centering device 142 provided on the other side of the stacker conveyor 129. Thus, the width between the opposite centering devices 142 is regulated in conformity with the width of the ream of packaged sheet 110, and the ream of packaged sheet 110 stacked on the pallet 109 comes to have the even and vertical side faces of a rectangular configuration.

In the foregoing, the ream of packaged sheet 110, being held by the suction pad 119 and the ream grip 124, is transferred onto the stacker conveyor 129 by the operation of the picking frame drive devices 114 and 117. When about one half of the ream of packaged sheet 110 are being transferred on the stacker conveyor 129, the ream grip 124 is tilted and released by the actuation of the grip shaking device 126 to an "open" position, and the ream of packaged sheet 110 is moved on the stacker conveyor 129 and is continued to be moved until it is stopped by the ream stopper 131. During this operation, another stacker conveyor is traveling underneath the above conveyor, and when the ream of packaged sheet 110 is brought into the second portion thereof, the ream of packaged sheet 110 is discharged therethrough onto the pallet 109.

More specifically, the stacker conveyor 129 is operated, by using a suitable positional sensor system such as proximity switches, such that it is temporarily stopped immediately when the cross bars reach the positions where the chains are directed vertically (the position just before the ream of packaged sheet is pulled into the stacker conveyor 129—picking-start position). Also, simultaneously with beginning pulling of the ream of packaged sheet 110, the stacker conveyor 129 is operated, and the ream of packaged sheets 110 is discharged onto the pallet 109 by means of the ream stopper 131, and simultaneously, as described earlier, the lift frame assembly 102 is lowered a distance equivalent to one ream, and the pallet 109 is lowered a distance equivalent to two reams. The stacker conveyor 129, after confirming that the second portion without the cross bars are secured by means of positional controls such as infrared ray emitter/photocell receiver, permits the infrared ray to move on, and stops them at the picking-start position. If the second portion without the cross bars is not secured, the chain driving device is stopped to carry out emergency stopping or slow down the speed, and it is started again after confirming the second portion without the cross bars is secured.

Figure 5:
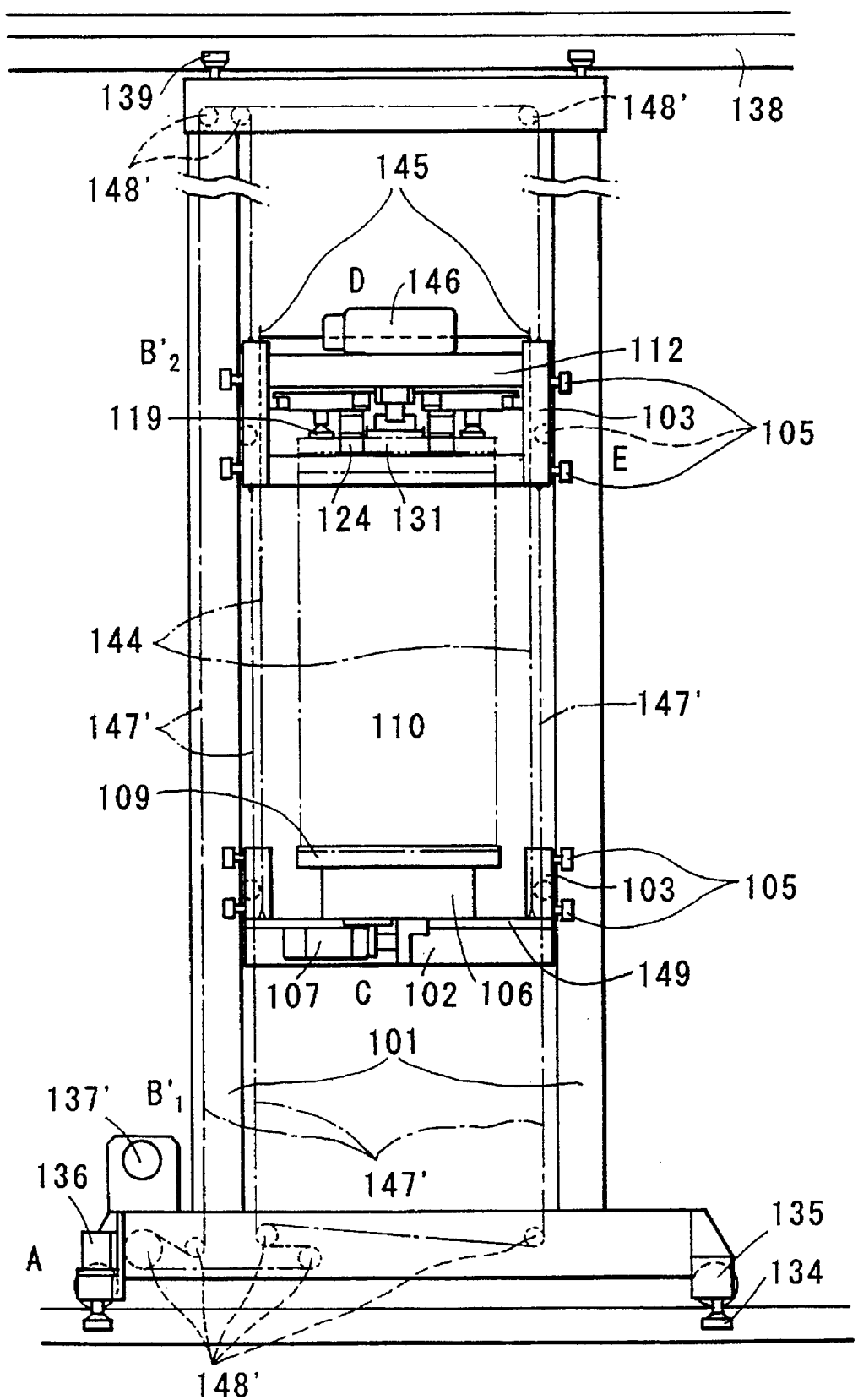
FIG. 5 is a front elevational view of a pick-up apparatus in accordance with another embodiment of the present invention.

FIGS. 3 to 5 show second and third embodiments of the present invention. The vertical lifting mechanism B comprises a first vertical lifting mechanism B1' having the picking, gripping and pulling mechanism D and the pulling, discharging and stacking mechanism E; and a second vertical lifting mechanism B2' having a lifting and pulling mechanism C. The main purpose of this arrangement is to provide a capability to load the lowermost shelf 111 by removing the lifting device 108 of the first embodiment.

In the vertical lifting mechanism B1', which includes the mechanisms D and E, the main frames 101 are connected at their upper and lower ends to form a rectangular frame structure, and the vertical lift frames 103 are attached to the frame structure for sliding movement. As depicted in FIG. 4, a plurality of vertical lift rollers 105 are mounted on each of the vertical lift frames 103 so as to be held in rolling contact with a respective main frame 101. Two series (longer path and shorter path) of endless lift chains 147', each in the form of a loop, are provided along the main frames 101, so as to run on lift chain wheels 148 provided for tension control purposes. In addition, a drive device for picking lift 137', including a suitable drive motor and auxiliary transmission mechanism, is provided on the vertical lift frame structure, and the lift chains 147' are operably connected to a drive wheel attached to the vertical drive device of lift frame 137'. Thus, the operation of the vertical lift frames 103 is controlled by the infrared control system comprising positioning sensors having infrared ray emitter/photocell receiver.

The above pick-up apparatus comprises a picking frame 112 of a rectangular frame structure which is formed by frame members arranged at right angles to each other, and is connected to the front and back vertical lift frames 103 in its center section. The vertical lift frames 103 are constructed to be slidable on the main frames 101 with the aid of front/back and left/right vertical lift rollers 105. In the first embodiment, the picking frame 112 is constructed integrally with the vertical lift frames 103 so as to move at the same time, but in this embodiment, the picking frame 112 is constructed separately from the vertical lift frames 103 so as to be operated independently from the operation of the vertical lift frames 103.

In the vertical lifting mechanism B2' which comprises the lifting and pulling mechanism C, as shown in FIGS. 3 and 5, a lifting platform 149 which slides with the main frames 101 in the direction of the stacker crane, is provided at the top end of the lift frame 102. The lifting platform 149 has a lateral dimension slightly larger than the pallet 109 and the extension fork device. The four corners of the lifting platform 149 are suspended from lift chains 144, and are connected directly to the top section of the picking frame 112 via lift chain wheels 145. The lifting platform 149 is operated independent of the pick-up device by operating a vertical drive device of lift frame 146. When the pick-up device is lowered by a distance equivalent to the height of one ream, the lift frame 102 is lowered by an amount equivalent to two reams. The height controls are achieved accurately by measuring the height of each ream by means of the infrared control system comprising positional sensors having infrared ray emitter/photocell receiver.

The vertical lift frames 103 disposed on both sides in the front/back direction of the lifting platform 149 is provided with front/back and left/right vertical lift rollers 105 to slide vertically on the main frames 101, and to provide sufficient spaces for permitting the lift chains 147' to pass through.

Figure 2:
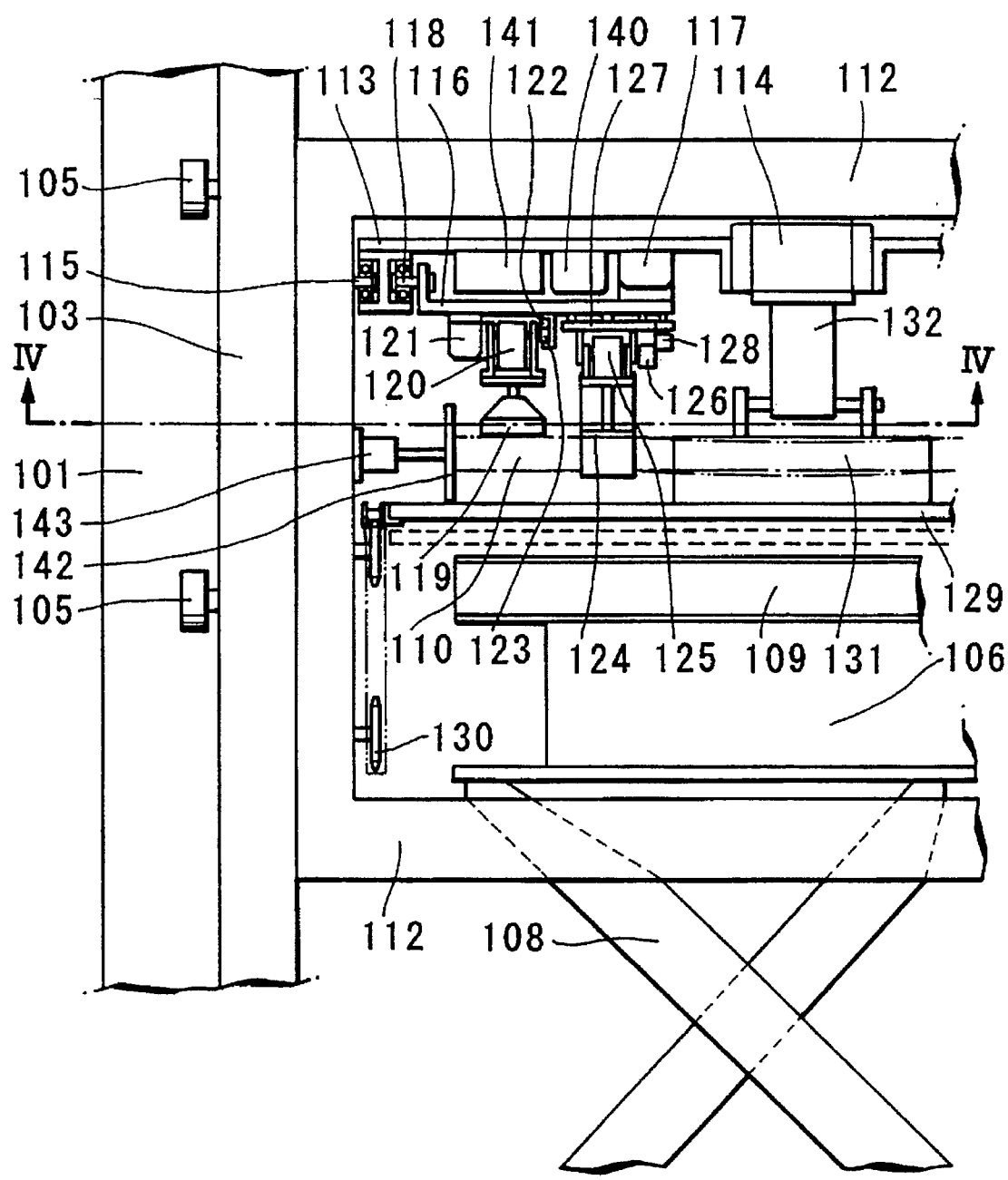
FIG. 2 is an enlarged front elevational view of the pick-up apparatus of FIG. 1, showing a sucking, gripping and pulling mechanism as well as a stacking mechanism.

Referring also to FIGS. 2 to 5, a third embodiment will be described. In FIG. 2, the mechanism B is illustrated so as to be the same as in the first embodiment. FIGS. 3 and 5 are shared between the second and third embodiments, and same reference numerals are used. The vertical lifting mechanism B1' having the mechanisms D and E is the same as in the second embodiment, and the vertical lifting mechanism B2' having the mechanism C is provided also.

The vertical lifting mechanism B2' having the lifting and pulling mechanism C comprises a rectangular shaped frame having the main frames 101 unitized at right angles at their top and bottom. The vertical lift frames 103 are supported by the vertical lift rollers 105 provided on both ends in the front/back direction on the main frames 101. The top and bottom ends of the vertical lift frames 103 are provided with a pair of hanging metal jigs to make an adjustable tension loop by means of the lift chain wheel 148 on both sides of the main frames 101 about the vertical center line of the main frames 101, and the two chains of long and short lift chains 147' are attached via the base chain wheel of the vertical drive device of lift frame 137, to the metal jigs. The vertical lifting mechanism B2' is made to operate independent of the pick-up device. When the pick-up device is lowered by a distance equivalent to the height of a ream, the lift frame 102 is lowered by an amount equivalent to two reams. The height controls are achieved accurately by measuring the height of each ream by means of the infrared control system comprising positional sensors having infrared ray emitter/photocell receiver.

The vertical lifting mechanism B1' comprising the mechanisms D and E, and the vertical lifting mechanism B2' comprising lifting and pulling device C are each connected to the top and bottom ends of the vertical lift frames 103 by means of two sets of lift chains and metal jigs via chain wheels to enable tension adjusting, in a loop shape via the base chain wheels of vertical drive device of lift frame 137 and the drive device for picking lift 137' within a rectangular shaped unitized frame. For the mechanisms B1' and B2' to be operable independent of each other, it is necessary that the four elevator chain sets must be assigned within the unitized frame with respect to the center line of the main frames 101. Thus, the width dimension of the main frame must be increased, and as shown in FIG. 4, and it is necessary to provide ample space for the lift chains 147 or 147' which are opposite to the sliding side of the main frames 101 with the vertical lift frames 103.

As described above, the present invention relates to a pick-up apparatus having various capabilities such as traveling, vertical lifting, lifting/pulling, picking/gripping, and pulling/discharging/stacking. The operation of all of these devices is controlled integrally by sequencing circuit for operating such assisting devices as servo drives and hydraulic drives in conjunction with various kinds of sensors. The power source for the driving device is provided on each device. For example in FIG. 1, the lifting device 108 is provided with an oil pump unit at the bottom thereof, and in FIG. 2, an air compressor unit 140 and a compressed air tank 141 are disposed on the picking shuttle frame 113, and are connected to the associated drive devices through flexible hoses.

Next, even more preferred embodiments of the automatic pick-up apparatus of the invention will be explained with reference to FIGS. 6 to 16.

Figure 6:
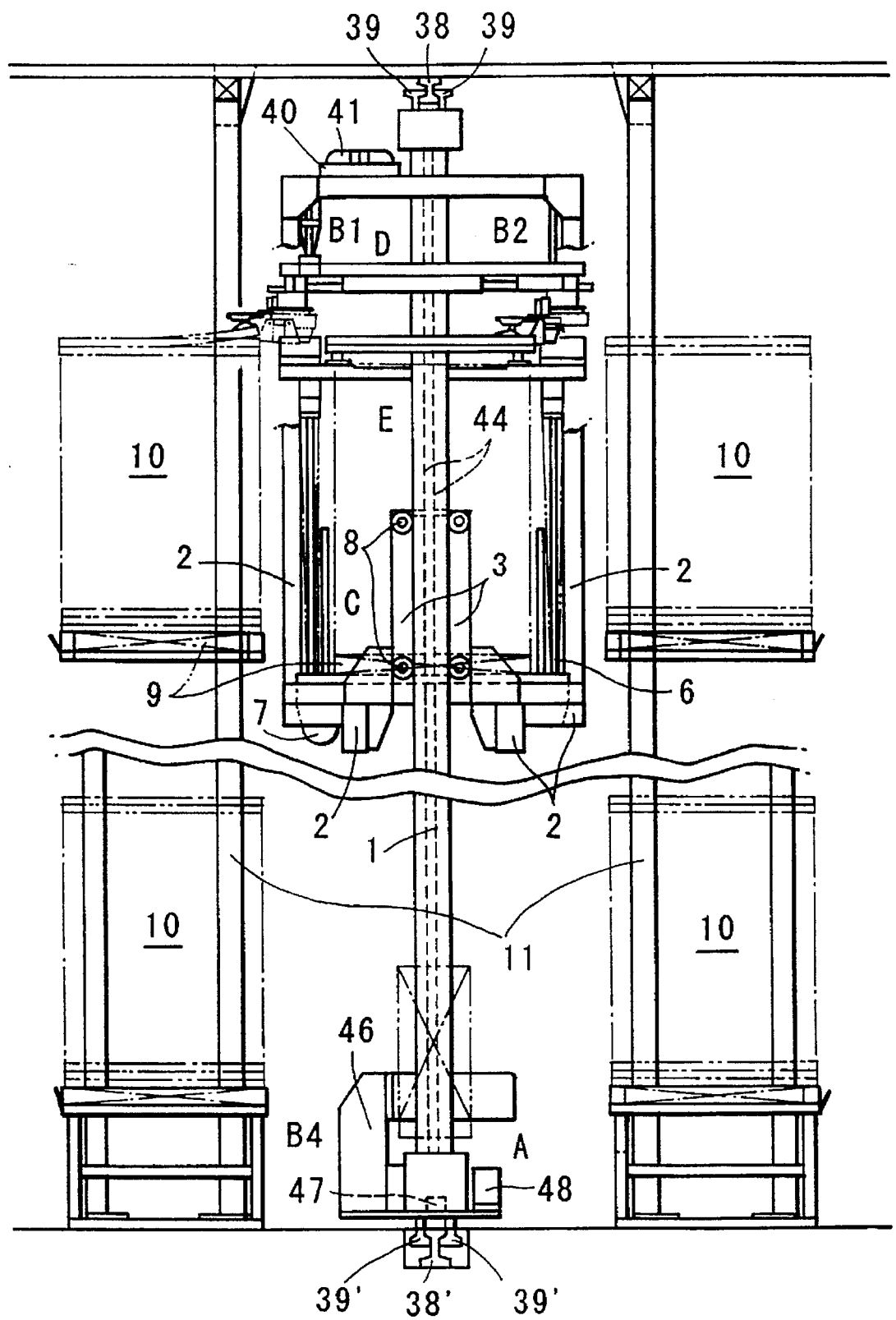
FIG. 6 is an overall side elevational view of a pick-up apparatus in accordance with a yet another embodiment of the present invention.
Figure 7:
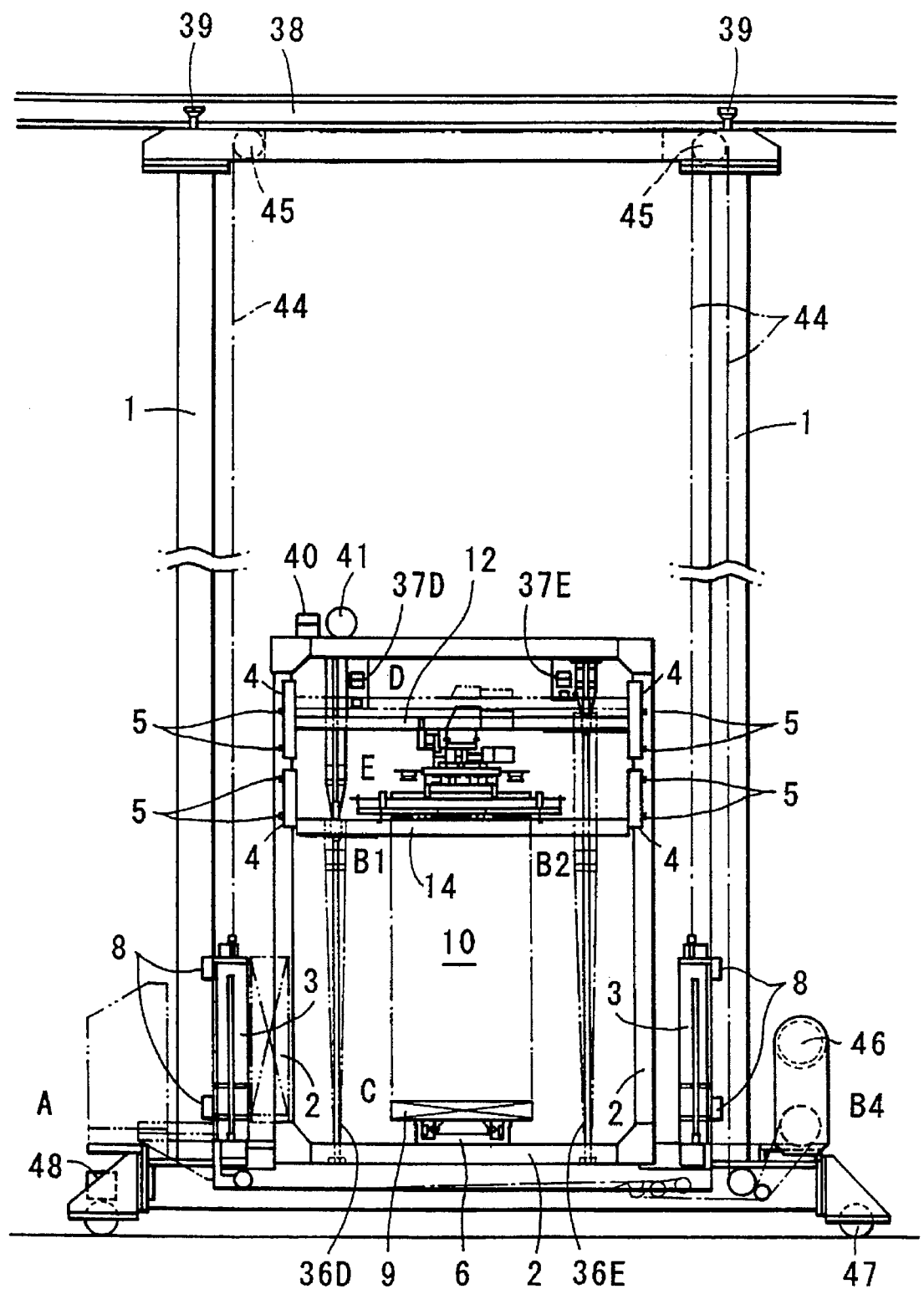
FIG. 7 is a front elevational view of the pick-up apparatus of FIG. 6.

FIG. 6 depicts an overall side elevational view of the pick-up apparatus, in accordance with a fourth embodiment of the present invention. As is the case with the previous embodiments, the pick-up apparatus is installed in an automated warehouse which comprises a number of vertically spaced racks each defining a plurality of shelves or cells arranged in a horizontal direction.

The pick-up apparatus comprises a horizontal traveling mechanism or device A; a lifting and pulling mechanism or device (pallet-handling device) C; a picking, gripping and pulling mechanism or device D; and a discharging, stacking mechanism or device E. In this embodiment, a first vertical lifting mechanism B1 is provided to move the picking, griping and pulling mechanism or device D, whereas a second vertical lifting mechanism B2 is provided to move the discharging and stacking mechanism E. In addition, a third vertical lifting mechanism B4 is provided to move a lift frame assembly 2 which supports the lifting and pulling mechanism C.

The detailed construction of each mechanism A, B1, B2, B4, C, D, E as well as its operation will be described in the following.

The traveling mechanism A is defined by a stacker crane installed in an automated warehouse. Specifically, the traveling mechanism A comprises a support frame structure of a generally rectangular shape including a pair of vertical front and back main frames 1 respectively disposed on front and back ends of the crane and a pair of upper and lower horizontal frames connecting the vertical main frames 1. An upper rail 38 and a lower rail 38' are respectively mounted on the ceiling and floor of the warehouse so as to extend on a line between opposing racks 11. Front and back pairs of upper guide rollers 39 are mounted on the upper horizontal frame so as to be held in rolling contact with the upper rail 38, and front and back pairs of lower guide rollers 39' are mounted on the lower horizontal frame so as to be held in rolling contact with the lower rail 38'. A pair of front and back running wheels 47 are further provided on the lower horizontal frame, and a drive device 48, which is comprised of a suitable drive motor mounted on the lower horizontal frame, is operably connected to the front running wheel 47, whereby the support frame structure or the stacker crane can be caused to travel along the racks while keeping a prescribed constant distance to a respective rack, and can be stopped at a desired position in front of a desired cell or shelf, by controlling the operation of the horizontal travel drive device 48 using a positional sensor system having, for example, infrared ray emitter/photocell receiver.

The lift frame 2 is of a rectangular frame structure defining a main support for a pick-up device, which includes the picking, gripping and pulling mechanism D and the discharging and stacking mechanism E, and is constructed to be moved up and down by the third vertical lifting mechanism B4. Specifically, a pair of right and left vertical lift frames 3 are attached to the lift frame 2. A plurality of vertical lift rollers 8 are mounted on each of the vertical lift frames 3 so as to be held in rolling contact with a respective main frame 1. In addition, a pair of endless lift chains 44 (or lift ropes), each in the form of a loop, are provided along the main frames 1, and are attached at both ends to the top and bottom ends of vertical lift frame 3 through suitable hanger members, so as to run on lift chain wheels 45 (or rope wheels) provided for tension control purposes. In addition, a vertical drive device of lift frame 46, including a suitable drive motor and auxiliary transmission mechanism, is provided on the lift frame structure, and the lift chains 44 are operably connected to a drive wheel attached to the vertical drive device of lift frame 46. Thus, the vertical lift frames 3 as well as the lift frame 2 can be moved up and down by the vertical drive device of lift frame 46 along the main frames 1. As is the case with the horizontal traveling mechanism A, the lift frame 2 can be stopped at a desired height, by controlling the operation of the vertical drive device of lift frame 46 using a positional sensor system having, for example, infrared ray emitter/photocell receiver. Thus, the lift frame 2, which carries the picking device, is moved such that the picking device is positioned roughly at a designated position which is near the top surface of the reams of the packaged sheet 10 to be handled.

Furthermore, when an operation on one shelf level is completed, the crane moves to the next shelf designated by the computer, by operating the crane horizontal travel drive device 48 and the vertical drive device of lift frame 46, and a next pick-up operation is commenced at the shelf. Normally, a pallet having a common delivery address is prepared by stacking various kinds of reams to a height of 1.5 m. When this height is reached, the loading of the pallet is completed, and the pallet is taken to the outgoing depot and is shipped out.

The lifting and pulling mechanism C comprises a shuttle fork 6 disposed on the lift frame 2, and a forking drive device operably connected to the shuttle fork 6 for driving the same. The shuttle fork 6 includes upper, middle and lower fork plates (not shown) supported through upper and lower sets of right and left support rollers so as to be retractable and extensible in a direction towards and away from the cell. Three chains are provided in the shuttle fork 6, with one end of each chain being connected to a respective fork plate thereof, and a chain wheel is provided to guide each chain to define an appropriate loop, whereby a successive movement mechanism is ensured. Thus, with the operation of the forking drive device 7, the lower fork plate, the middle fork plate and the upper fork plate are successively extended or retracted in operable association with each other. The positioning of the fork plates is carried out accurately, by controlling the operation of the forking drive device 7 using a positional sensor system having, for example, infrared ray emitter/photocell receiver, such that the upper fork plates are stopped at predetermined three positions, i.e., a foremost position, a middle position and a back position.

In operation, the lifting and pulling mechanism C is used to pull in an empty pallet 9 from the shelf 11 prior to loading the pallet 9. More specifically, empty pallets 9, which are stacked on the cells, may be moved to the ingoing/outgoing depot, depalletized into respective pallets by a depalletizer, and taken one by one therefrom. Otherwise, an empty pallet is taken, one by one, from the stacked pallets on the cells, by the operation of the picking, gripping and pulling mechanism D, and is placed on the fork 6 by the discharging and stacking mechanism E. When a pick-up is not required, the pallet 9 having a full load of reams in the crane, and the pallet 9 is taken to an outgoing depot and is shipped out.

The picking, griping and pulling mechanism D comprises a picking frame 12 of a generally rectangular shape surrounded by four corner frames and two slide frames of the lift frame 2, and a pair of vertical lift frames 4 fixedly secured to the opposite sides of the picking frame 12. A plurality of vertical lift rollers 5 are mounted on each of the vertical lift frames 4 so as to be held in rolling contact with a respective slide frame of the lift frame 2, so that the picking frame 12 can be moved vertically.

Furthermore, a pair of first picking shuttle frames 13 of a channel shaped cross-section are disposed on the lower surface of the picking frame 12 at a generally central portion thereof. Each first picking shuttle frame 13 has right and left sets of picking guide rollers 15 attached to the inner vertical walls thereof, and a second picking shuttle frame 16 is accommodated in a respective first picking shuttle frame 13 so as to be slidable therewith through the picking guide rollers 15. Moreover, a third picking shuttle frame 17 having right and left sets of picking guide rollers 18 is accommodated in the second picking shuttle frame 16, with the picking guide rollers 18 being held in rolling contact with the second picking shuttle frame 16. The second picking shuttle frame 16 has rack gears formed on a rear surface thereof, and a picking frame drive device 25 having a driving gear attached to an output shaft thereof is mounted on the third picking shuttle frame 17 with the driving gear being engaged with the rack gears on the second picking shuttle frame 16. In addition, three extension chains are provided with one end of each chain being connected to a respective picking shuttle frame, and a chain wheel is provided to guide each chain to define an appropriate loop, whereby a successive step-up movement mechanism is ensured. Thus, with the operation of the picking frame drive device 25, the third picking shuttle frame 17, the second picking shuttle frame 16 and the first picking shuttle frame 13 are successively extended or retracted in operable association with each other. The positioning of the shuttle frames is carried out very accurately, by controlling the operation of the picking frame drive device 25 using a positional sensor system having, for example, infrared ray emitter/photocell receiver, such that the shuttle frames are stopped at predetermined three positions, i.e., a foremost position, a middle position and a back position.

Moreover, a picking turn table 27 is provided under the third picking shuttle frame 17 so as to be rotatable through guide wheels 52. Specifically, there are provided a turn table drive device 28 having an output shaft, and a speed reducer 49 connected to the output shaft of the turn table drive device 28 and having a spur gear 51 connected thereto. In addition, an internal gear 50, engaged with the spur gear 51, is disposed under the speed reducer, and the picking turn table 27 is attached to the internal gear 50. Mounted on the lower face of the picking turn table 27 at a forward end thereof are more than two (preferably four) suction members each having a suction pad 19, which is connected by a flexible hose to a vacuum generator 40 and a vacuum tank 41 through a solenoid valve. A pair of slide rails of ream grip drive 30 are disposed under the picking turn table 27, and a pair of slide bearings of ream grip drive 29, under which a frame including a pair of slide blocks of ream grip 31 is secured, are fitted in the rails for sliding movement therealong. In addition, a pair of slide arms of ream grip 32 are supported by the picking turn table 27 for sliding movement therealong, and the slide blocks 31 of ream grip 32 are supported by these arms of ream grip 32. Furthermore, a ream grip 24 is attached to the slide blocks 31 of ream grip 32 and the slide arms of ream grip 32, and a suitable ream grip drive device 26 is mounted on the lower surface of the picking turn table 27 to move the slide blocks 31 and the arms 32 in a direction toward and away from a respective cell.

In operation, the suction pad 19 is driven by the mechanism B1 to be pressed towards the forward portion of the top surface of the reams of packaged sheet 10, and, by opening the solenoid valve associated with the respective suction pad 19 is opened to cause the suction pad 19 to apply suction to and pick-up the reams of packaged sheet 10. If the degree of vacuum is not increased after a prescribed period of time has passed, the system will be closed while judging that there must be a leakage of air due to breakage of wrapping paper or the like. If the degree of vacuum reaches a predetermined level, then the suction pad 19 is moved upwards by the mechanism B1 to ensure between the paper reams and the remaining reams of packaged sheet 10 the space for allowing the insertion of the ream grip 24. Alternately, while lifting the ream, the suction pad 19 is pulled about 5 to 6 cm into a position where the ream grip can grip the forward end of the ream, to ensure the space for allowing the insertion of the ream grip 24. In the latter case, if the suction pad 19 is lifted by the mechanism B1 during the pulling, the time required for one cycle is lessened by almost one second.

Figure 9:
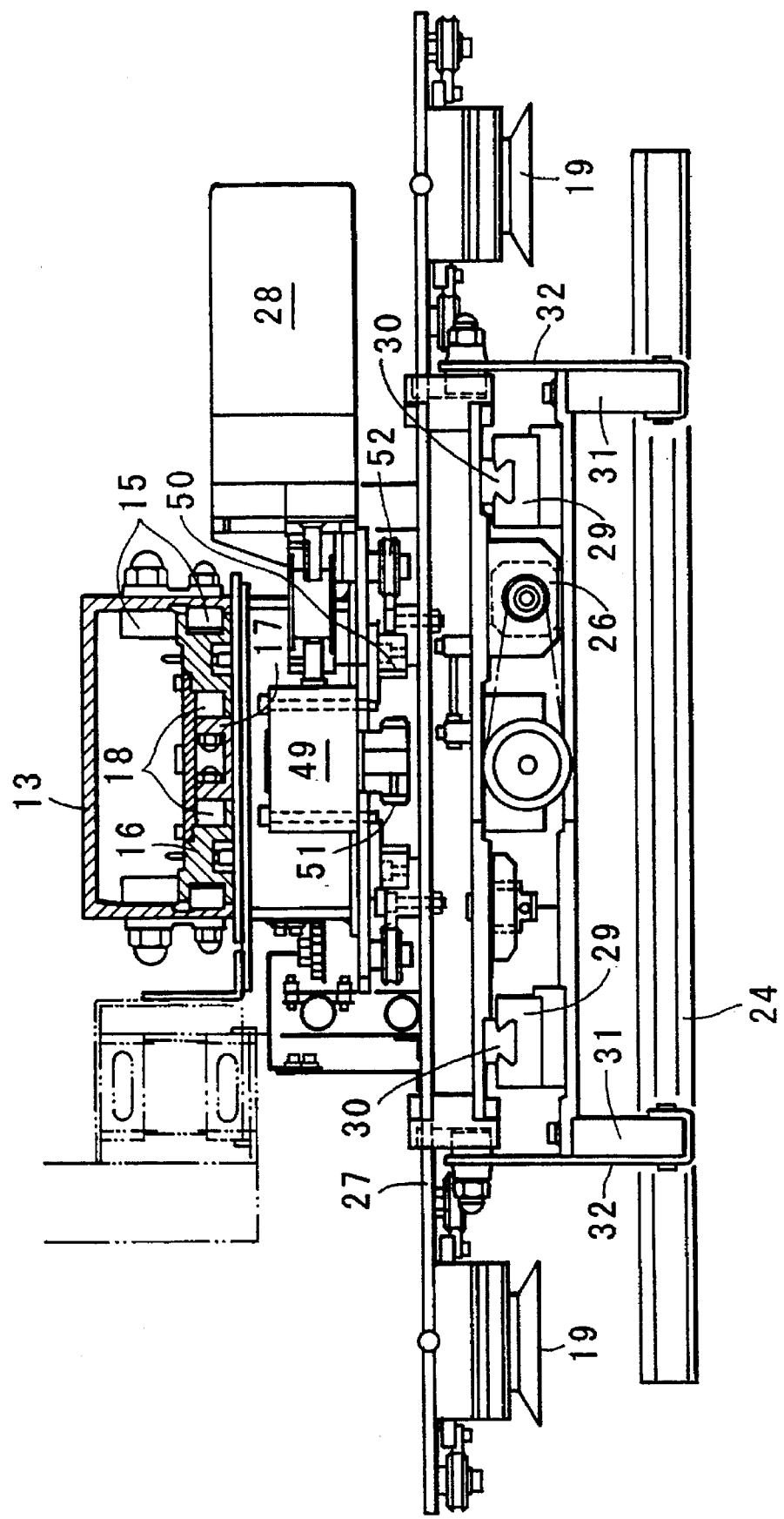
FIG. 9 is an enlarged front view showing the picking, gripping and pulling mechanism and the stacking mechanism of FIG. 8.
Figure 10:
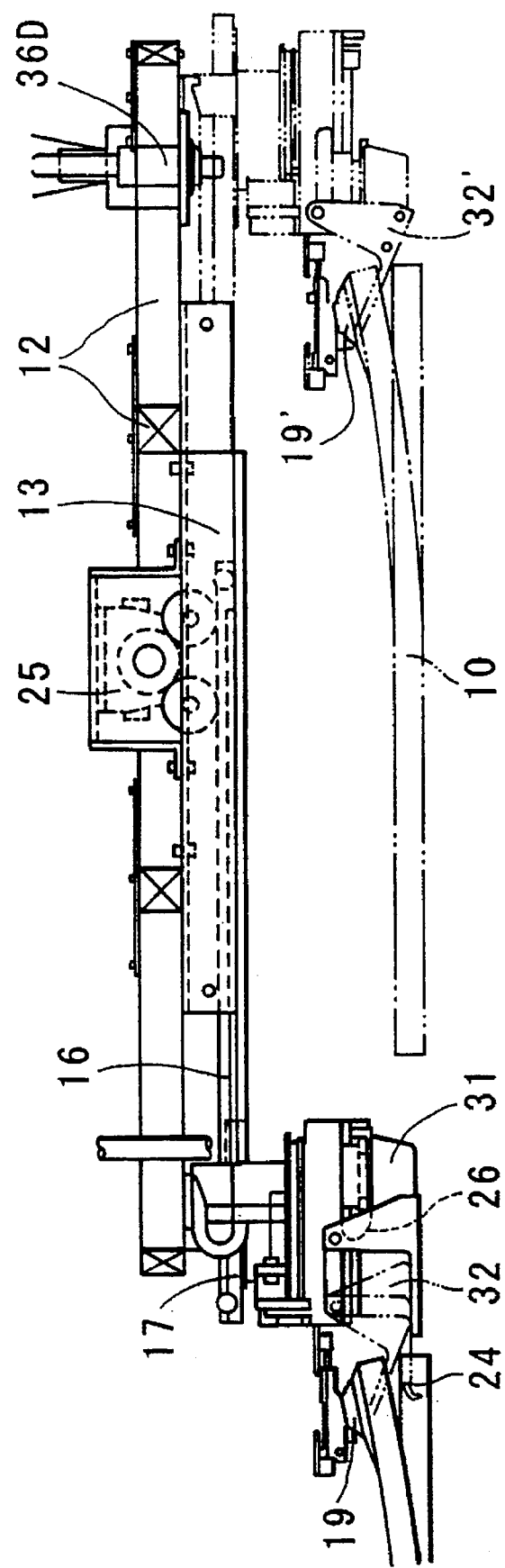
FIG. 10 is an enlarged side view of the picking, gripping and pulling mechanism and the stacking mechanism of FIG. 8.

As shown in FIGS. 9 and 10, when the suction pad 19 is moved upwards by the mechanism B1 to lift the forward end of the reams, the blocks 31 and the arms 32 are moved forwardly by the operation of the grip drive device 26 to cause the forward end of the ream grip 24 to be inserted under the reams. When a fulcrum of the arms 32 arrives at a terminal position, as designated at 32' in FIG. 10, the slide blocks 31 of the ream grip are caused to move forwardly to pivot the forward end of the ream grip 24 upwards in an arcuate manner about the fulcrum of the slide arm of ream grip 32, so that the reams of packaged sheet 10 are grasped between the suction pad 19 and the ream grip 24.

Figure 8:
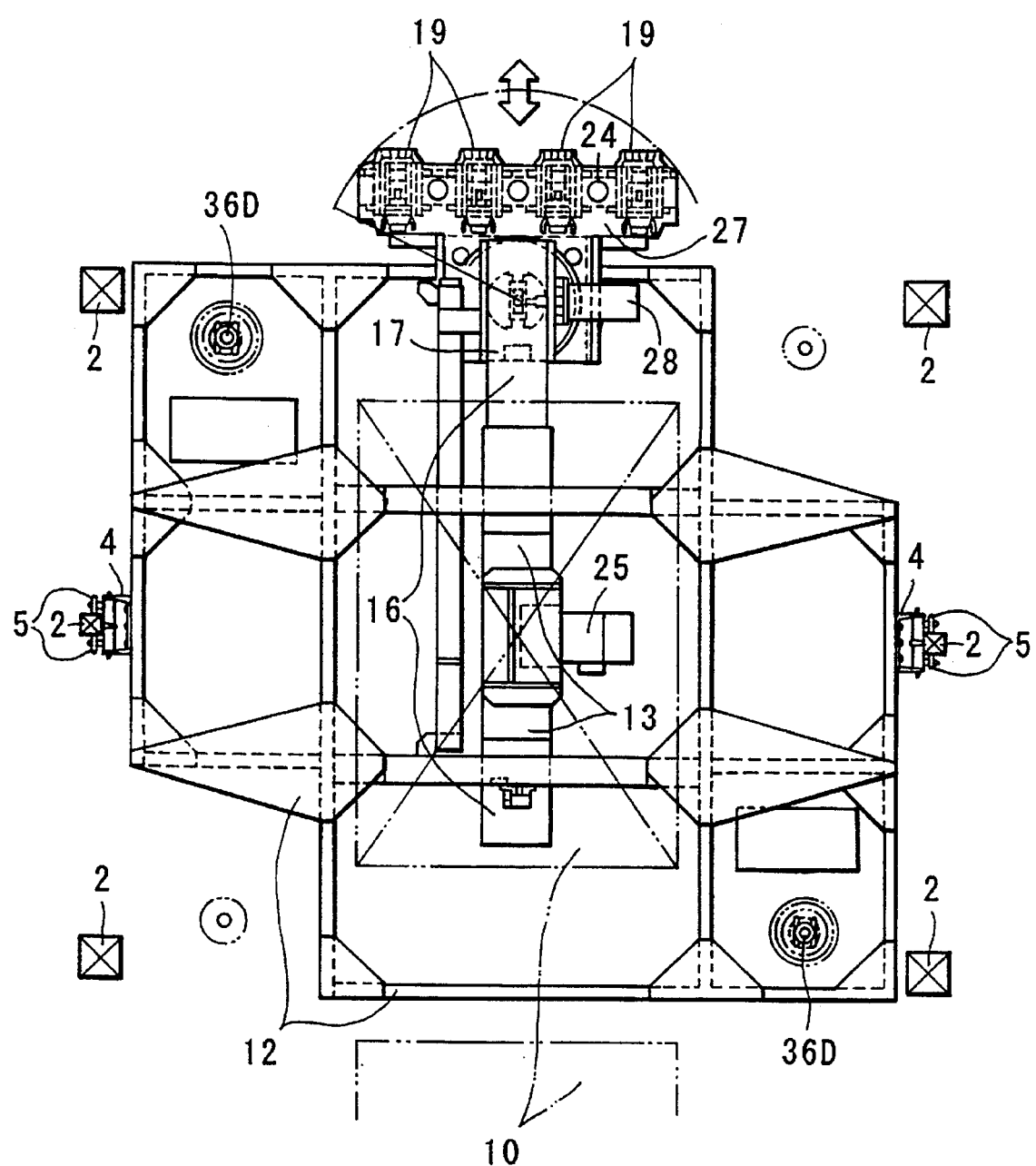
FIG. 8 is an enlarged plan view of the apparatus of FIG. 6, showing a picking, gripping and pulling mechanism as well as a stacking mechanism.

As shown in FIGS. 8 to 10, as the reams of packaged sheet 10 are sandwiched between the suction pad 19 and the ream grip 24, the picking shuttle frame 17 is moved back to the retracted position as indicated by the dashed line in FIG. 10, and the ream of packaged sheet 10, as indicated by the two-dot chain line, are pulled to a central position for loading. Then, simultaneously with the closing of the solenoid valve to release the suction pad 19, the grip drive device is driven reversely to release the ream grip 24, to release the reams on the center open and close table 20.

When the mechanism D release the reams, the reams are moved by the picking shuttle frame drive device 25 to an intermediate position (when picking is completed) or a left position (when picking is started again). In the case where the picking operation at the right position is to be carried out, the third picking shuttle frame 17 is turned by the turn table drive device 28 and stopped at a prescribed position by a positional sensor system such as proximity switches. Thus, the picking operation can be commenced for the racks on the other side in the automated warehouse.

The discharging and stacking mechanism E comprises an open and close table frame 14 of a generally square shape surrounded by four corner frames and two slide frames of the lift frame 2, and a pair of support frames fixedly secured to the opposite sides of the open and close table frame 14.

A plurality of guide rollers are mounted on each of the vertical lift frames 4 so as to be held in rolling contact with a respective slide frame of the lift frame 2, so that the open and close table frame 14 can be moved vertically.

Disposed on the open and close table frame 14 are a pair of stacker conveyors 33 and an open and close table 20. Each stacker conveyor 33 is comprised, for example, of a plurality of rolls, air tables, or a belt conveyor, and is arranged at the forward or rearward end of the open and a close table frame 14 adjacent to a respective shelf. With these conveyors 33, the ream of packaged sheet 10, the forward end of which is being held by the associated ream grip 24, can be conveyed very smoothly on a center of the open and close table frame 14 without causing any damage thereto. The open and close table 20 is comprised of a pair of plates arranged movable towards and away from each other so as to define an opening having a size larger than at least one ream of packaged sheet.

Figure 11:
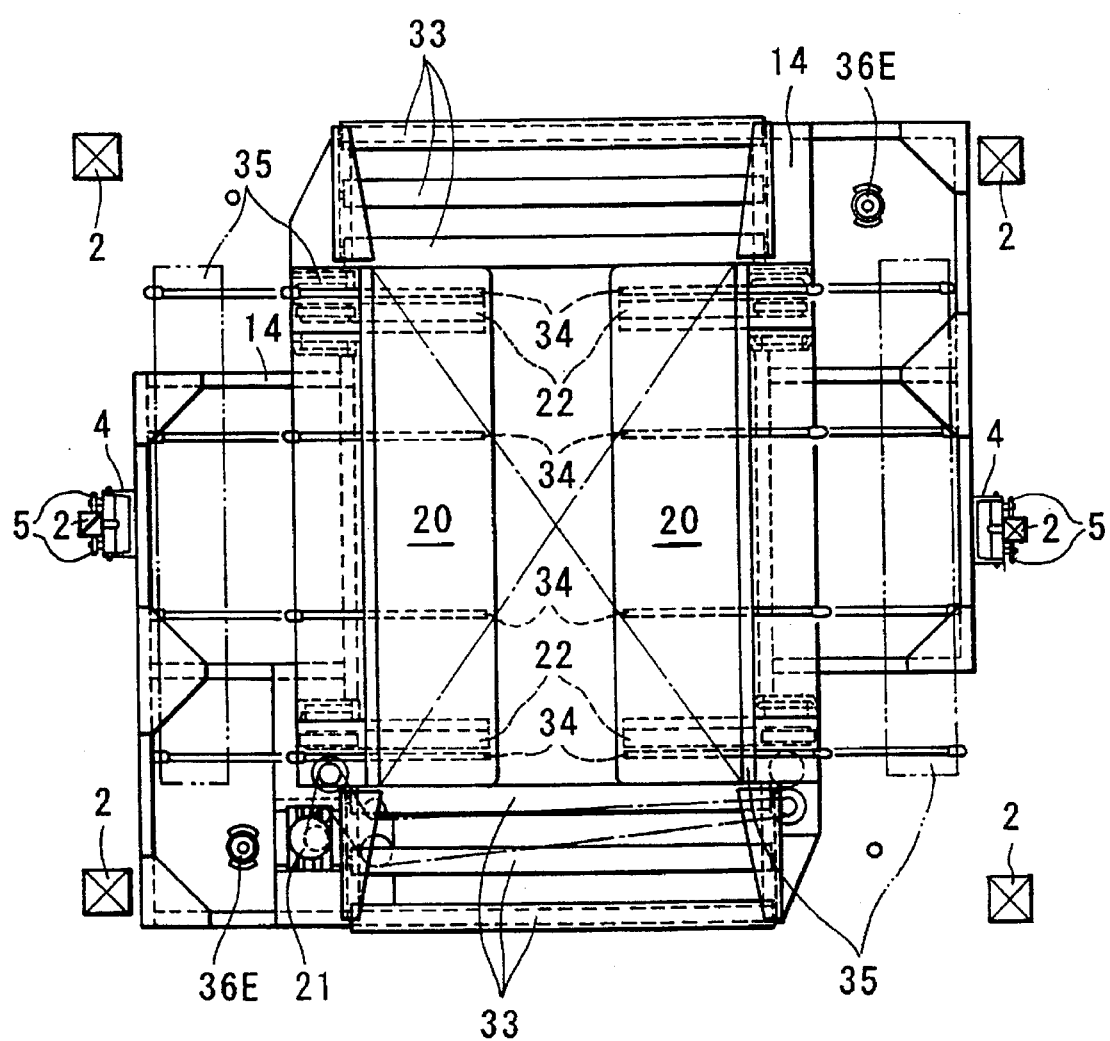
FIG. 11 is a plan view of the stacking mechanism of the apparatus of FIG. 6.
Figure 12:
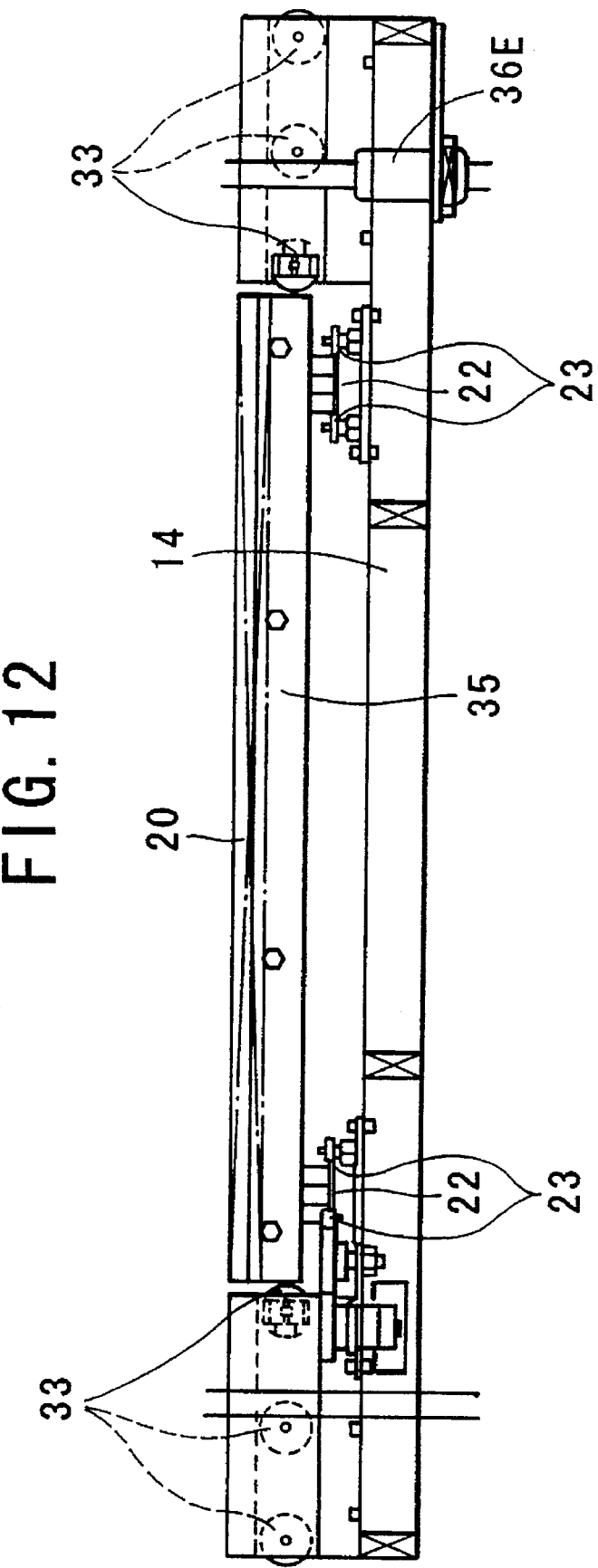
FIG. 12 is a side elevational view of the stacking mechanism of FIG. 11.
Figure 13:
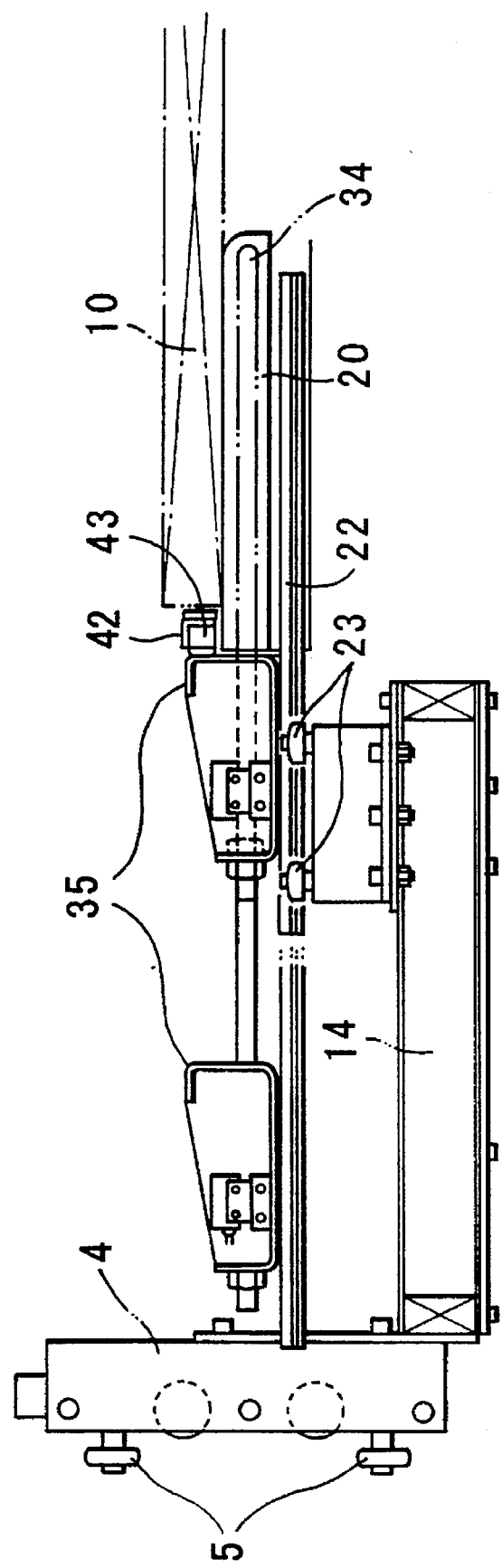
FIG. 13 is a view showing the operation of the stacking mechanism of FIG. 11.

In the embodiment illustrated in FIGS. 11 to 13, a plurality of sets of table guide rollers 23 are arranged on the open and close table frame 14, and a plurality of sets of table drive racks 22 are arranged so as to be slidable by being guided by the table guide rollers 23. A pair of fork frames 35, each having a plurality of elongated forks 34 attached thereto, are mounted on the associated table drive racks 22. In addition, a table drive device 21 and a transmission mechanism thereof, which are operable to move the opposing pairs of the table drive racks 22 towards and away from each other through chains shown by the dashed line in FIG. 11, are attached to the fork frames 35.

In the foregoing, even if only open and close forks are provided, such forks can receive and load the ream of packaged sheet 10, which is being transferred by the ream grip 24 through the stacker conveyor 33, if the ream of packaged sheet 10 is relatively light in weight. However, if the ream is heavy weight, the ream of packaged sheet or inside sheet product may be damaged. In order to circumvent this problem more effectively, the open and close tables 20, which are secured on the forks 34, are constructed so as to be an air table. More specifically, the open and close table 20 includes a table plate having a great number of air holes formed therethrough, a plurality of small-diameter balls supported by springs and arranged under the table plate, and a source of compressed air connected to the air holes. In this case, when the ream of packaged sheet 10 is pulled onto the open and close table 20, the balls are caused to move downwards by the increased weight to permit air to blow through the air holes upwards. Thus, the open and close table 20 ensures very smooth movement of the ream of packaged sheet without causing any damages thereon.

Furthermore, a pair of centering devices 42 and a pair of centering drive devices 43, each operably connected to a respective centering device 42 to drive the same, are mounted on the opposing sides of the opposing fork frames 35. With this construction, the ream of packaged sheet 10 can be centered into a predetermined position even though the conveyed ream of packaged sheet 10 is inclined.

The picking device includes the aforesaid mechanism D on the upper side and the aforesaid mechanism E on the lower side, both mechanisms being surrounded by the four corner frames and two slide frames of the lift frame 2. A pair of ball splines for vertical lift of picking mechanisms 36D, comprised of ball screws or racks, are connected to the picking frame 12 of the mechanism D through bearings or drive gears, whereas a pair of ball splines for vertical lift of open and close table 36E, comprised of ball screws or racks, are connected to the open and close table frames 14 of the mechanism E through bearings or drive gears. In the case of ball screws, a drive pulley is attached to one end of the ball screw, and is connected to a picking lift drive device 37D and an open and close table lifting drive device 37E. Thus, the lifting mechanisms described herein constitute the vertical lifting mechanism B1 for picking system D and the vertical lifting mechanism B2 for stacking system E, respectively.

In operation, as described above, the picking, gripping and pulling mechanism D is first moved to be roughly positioned adjacent to the top surface of the ream of packaged sheet on a designated shelf by the operation of the vertical lifting mechanism B4 for lift frame. Then, the mechanism B1 is operated to accurately position the mechanism D based on the signals obtained by the positional sensor system. Subsequently, after the mechanism D is operated to pull the ream of packaged sheet 10 onto the open and close table 20, the vertical lifting mechanism B2 is operated to lower the mechanism E, based on the signals regarding the ream of packaged sheet 10 or the pallet 9, to a position adjacent to the pallet 9, which is being pulled by the mechanism C. Subsequently, the ream of packaged sheet 10, the periphery of which is straightened, is moved downwards onto an accurate position on the pallet 9, by operating the table drive device to open the open and close table 20. After the completion of loading, the mechanism B2 is operated to move the mechanism E to a position underneath the mechanism D, and the open and close table 20 is closed by the operation of the table drive device 21.

In repetitive upward and downward movements of the mechanism D, inasmuch as the reams are picked up one ream at a time the distance of the downward movement becomes greater by the thickness of the ream than that of the upward movement.

The aforesaid fourth embodiment will be further modified into fifth and sixth embodiments.

The fifth embodiment differs from the fourth embodiment in the construction of the vertical lifting mechanism B2 for stacking system E. Namely, in the fifth embodiment, the open and close table 14 of the mechanism E is not connected to a ball spline or rack 36E. Instead, a lifter, which serves as the mechanism B2, is disposed on the lift frame 2. The lifter is operably connested to the mechanism E while keeping a space for installing the mechanism C, and is constructed to be driven by a hydraulic cylinder or servo motor.

Furthermore, the sixth embodiment differs from the fourth or fifth embodiment in that the mechanisms D and E are unitized so as to be simultaneously movable, and that the mechanism C instead of the mechanism E is lifted. Namely, the mechanism D and the mechanism E are connected to each other to define a unitary construction, and the unitary mechanism is caused to move up and down by the mechanism B1 or the mechanism B2. Furthermore, a lifter, which serves as the mechanism B2, is disposed on the lift frame 2. The lifter is operably connected to the mechanism E while keeping a space for installing the mechanism C, and is constructed to be driven by a hydraulic cylinder or servo motor. In the sixth and seventh embodiments, the mechanism C is moved up in advance by the mechanism B3 to a position adjacent to the mechanism E. Subsequently, the ream of packaged sheet 10 is precisely loaded at a prescribed position on the pallet 9, and the mechanism C is moved downwards a distance twice that for the downward movement of the mechanisms D and E.

In the seventh embodiment, the mechanisms D and E are also unitized and simultaneously moved by the mechanisms B1 or B2. In addition, the mechanism B3, which comprises a drive device such as hydraulic motor or servo motor to drive ropes or chains, is disposed near the lift frame 2 or the open and close table frame 14.

In the seventh embodiment, it is possible to arrange the mechanisms D and E as well as the main frame structure very close to each other. Therefore, it is not necessary to provide between the main frame structure and the mechanism a space of 1.5 to 1.8 m which is necessary with the fourth to sixth embodiments. In particular, in the case where the mechanisms are unloaded, it is possible to cause the mechanism E and C to approach very close to each other as if they contacted each other.

Figure 14:
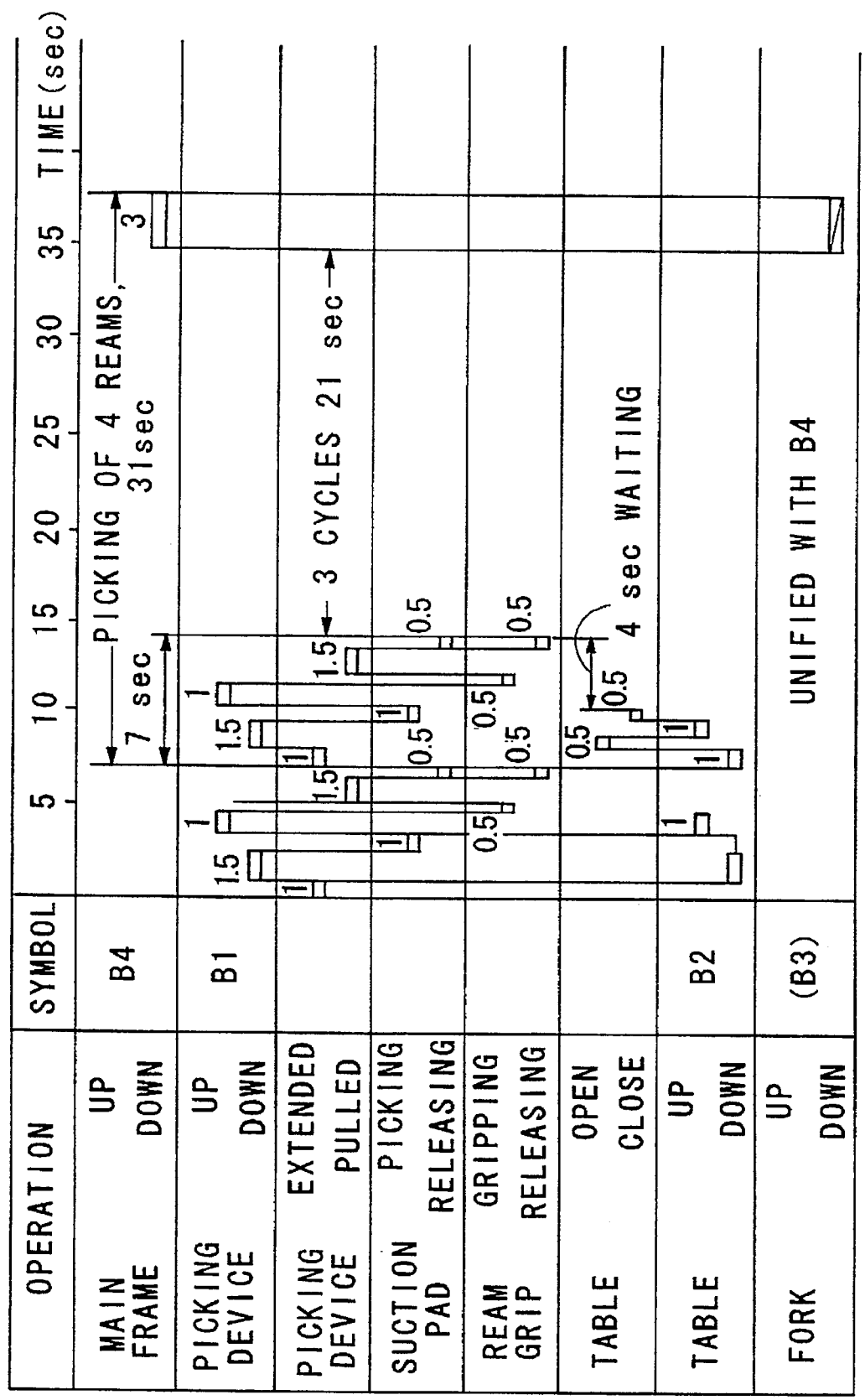
FIG. 14 is a diagrammatical representation showing a time table of operation.

Moreover, FIG. 14 depicts a time table for the cycle of operations of the fourth and fifth embodiments. The standard time for one cycle of picking operation is about 7 seconds in the case where the extending or retracting speed of the picking, gripping and pulling mechanism D (19 and 24), the moving speed of the mechanisms B1 and B2 (for moving the mechanism D and the mechanism E, respectively), the moving speed of the mechanism B4, the opening or closing speed of the open and close table 20, the opening or closing speed of the ream grip 24, and the moving speed of the mechanism B3 (for the mechanism C) are set to 1130 mm/sec, 700 mm/sec, 250 mm/sec, 670 mm/sec, 250 mm/sec and 250 mm/sec, respectively. Thus, when four reams are picked up at the same position, it will take 28 seconds, and if it takes 3 seconds to move from the completion of picking to the next operation, the total cycle time will be 31 seconds.

Figure 15:
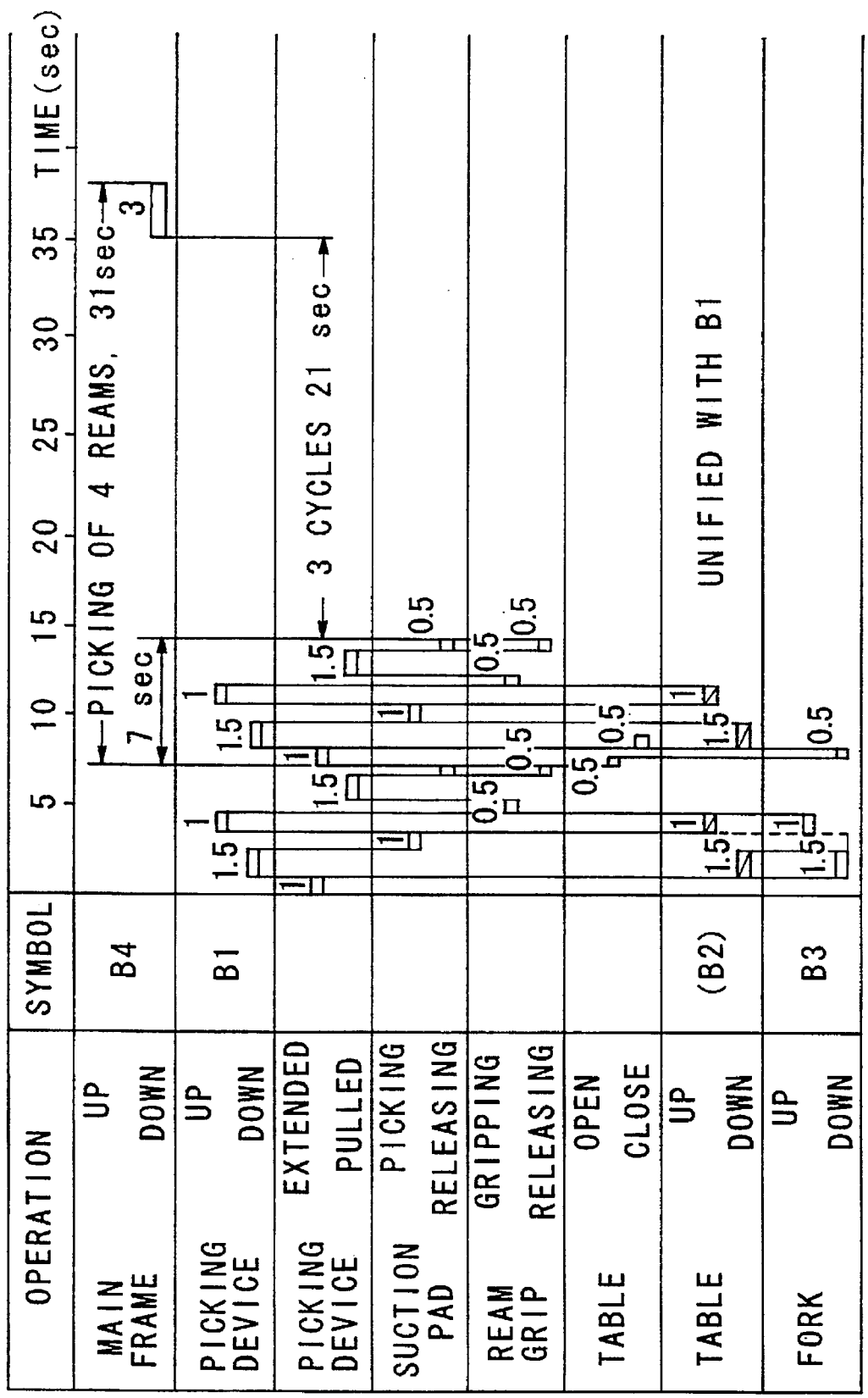
FIG. 15 is a diagrammatical representation showing a time table of another example of operation.

Furthermore, FIG. 15 depicts a time table for the cycle of operations of the sixth and seventh embodiments. As is the case with the previous two embodiments, the standard time required for one cycle of picking operation is about 7 seconds. When four reams are picked up at the same position, if it takes 3 seconds to move from the completion of picking to the next operation, the total cycle time will be 31 seconds.

Figure 16:
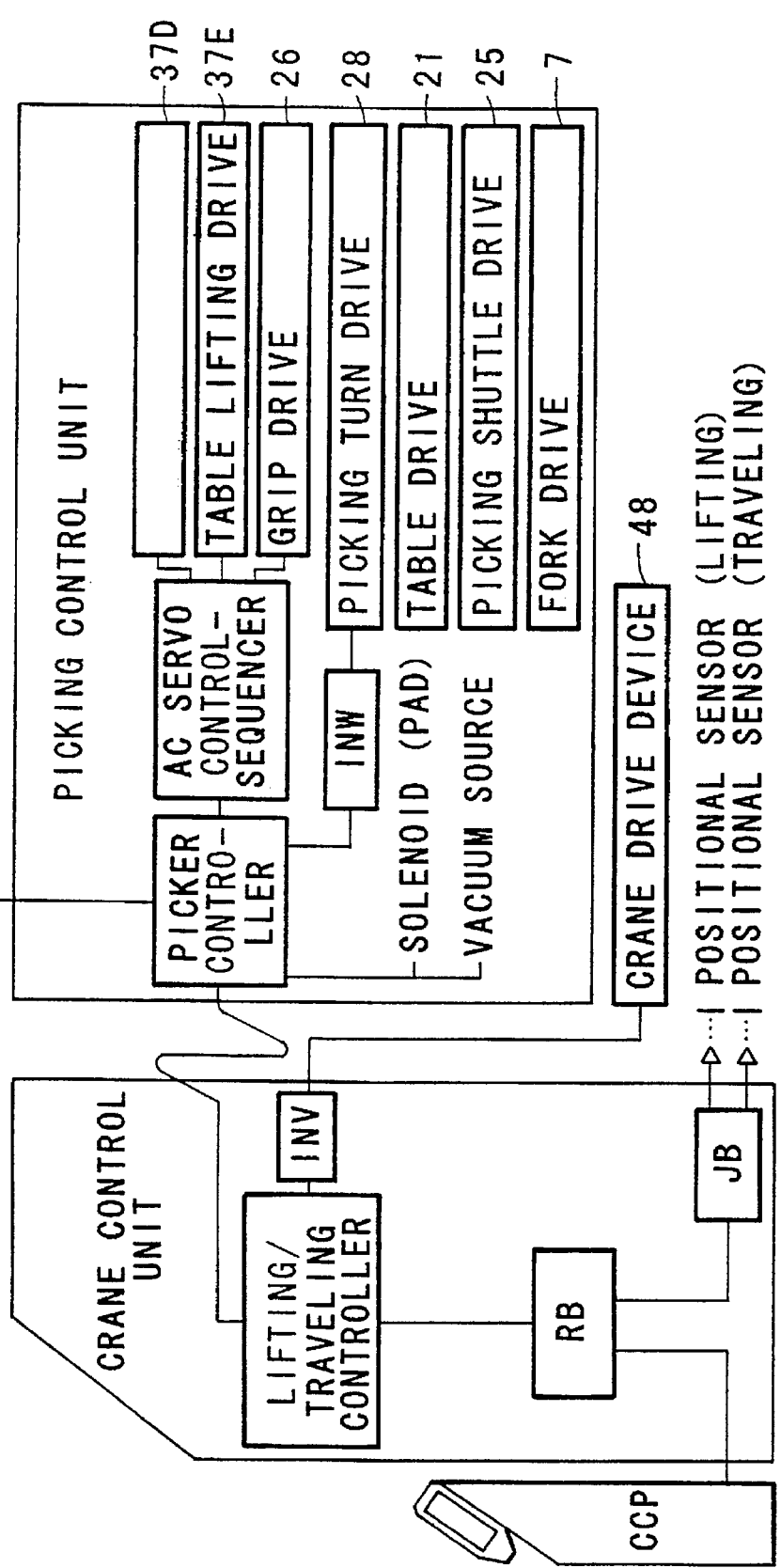
FIG. 16 is a block diagram showing a control system of the pick-up apparatus in accordance with the fourth embodiment of the invention.

Furthermore, FIG. 16 depicts a block diagram of a control system of a pick-up apparatus in accordance with the fourth embodiment of the invention. As will be seen from the drawing, the control system includes a picking control unit, a crane control unit connected to the picking control unit, and a central control unit, to which further control systems relating general management of the automated warehouse and the like are connected. The crane control unit includes a lifting/traveling controller which is operable to control the traveling mechanism, whereas the picking control unit includes a picking controller, to which the picking lift drive device 37D, the table lifting drive device 37E, the ream grip drive device 26, the picking turn table drive device 28, the open and close table drive device 21, the picking frame drive device 25 and the fork drive device 7 are connected. In the drawing, CCD, RB, JB, CDD and INV denote a central control panel, a relay board, a junction board, the crane drive device and an inverter, respectively. In addition, various positional sensors as mentioned above are connected to the associated controller. Thus, the control system of the above construction is activated to carry out the picking operations as already described previously.

As described above, the present invention provides a pickup apparatus having various capabilities such as traveling, vertical lifting, lifting/pulling, picking/gripping, and discharging/stacking. The operation of all of these devices is controlled integrally by a sequencing circuit for operating such assisting devices as servo drives and hydraulic drives in conjunction with various kinds of sensors. Thus, all of the prior art problems mentioned previously can be circumvented.

Furthermore, in the first to third embodiments, the lifting mechanism B1 is provided to operate both the heavy mechanisms D and E by employing very long chains running along the main frame 101. Therefore, it has been difficult to attain high positioning precision and speed. However, in the remaining embodiments of the invention, the mechanism D or E is constructed to be operated by the high-precision lifting device B1 or B2. Accordingly, the positioning accuracy as well as the operational efficiency are substantially improved. Finally, the present application claims the priorities of Japanese Patent Application No. 6-125801 filed May 16, 1994, Japanese Patent Application No. 6-170300 filed Jun. 28, 1994, and Japanese Patent Application No. 6-293910 filed Nov. 2, 1994, which are all incorporated herein by reference.

What is claimed is:

1. A method of picking up a ream of packaged sheets of a desired kind from a plurality of reams of one or more kinds stacked on one of a plurality of cells in an automated warehouse and loading the picked-up ream on a pallet, the cells constituting a plurality of vertically spaced groups of horizontally extending racks, said method comprising the steps of:

locating a suction pick-up device having a picking, gripping and pulling mechanism and a discharging and stacking mechanism, at a position adjacent to said one of said cells by moving the pick-up device at least one of horizontally and vertically;

locating the pallet at a prescribed position;

positioning the pick up device over the ream of packaged sheets to be picked-up; and operating the suction pick-up device to pick-up by suction the ream of packaged sheets of the desired kind from said plurality of reams stacked on a respective one of cells, said operating step including operating said picking, gripping and pulling mechanism to pick upwards and grip the stacked ream by suction to pull the stacked ream, and operating said discharging and stacking mechanism to withdraw the ream and discharge and stack the ream on said pallet.

2. A method according to claim 1, wherein said pick-up device locating step includes positioning said pick-up device with rough precision and subsequently positioning the same with higher precision.

3. A method according to claim 1, wherein said pick-up device operating step includes positioning said picking, gripping and pulling mechanism and said discharging and stacking mechanism to prescribed positions adjacent to the ream, so as to be independent from each other.

4. A method according to claim 1, wherein said pick-up device operating step includes positioning said picking, gripping and pulling mechanism and said discharging and stacking mechanism to prescribed positions adjacent to the ream simultaneously in association with each other.

5. A method according to claim 1, further comprising repeating said locating, positioning, and operating steps to stack a desired number of the reams of the same or different kinds on the pallet.

* * * * *